(12) United States Patent
Wehrenberg et al.

(10) Patent No.: US 9,575,569 B2
(45) Date of Patent: Feb. 21, 2017

(54) METHODS AND APPARATUSES FOR OPERATING A PORTABLE DEVICE BASED ON AN ACCELEROMETER

(71) Applicant: Apple Inc., Cupertino, CA (US)

(72) Inventors: Paul J. Wehrenberg, Cupertino, CA (US); Aaron Leiba, San Francisco, CA (US); Richard C. Williams, Saratoga, CA (US); David R. Falkenburg, Cupertino, CA (US); Louis G. Gerbarg, Cupertino, CA (US); Ray L. Chang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/605,950

(22) Filed: Jan. 26, 2015

(65) Prior Publication Data

US 2015/0130719 A1 May 14, 2015

Related U.S. Application Data

(60) Continuation of application No. 12/645,457, filed on Dec. 22, 2009, now abandoned, which is a division of
(Continued)

(51) Int. Cl.
*G06F 3/0346* (2013.01)
*G06F 1/16* (2006.01)

(52) U.S. Cl.
CPC ........... *G06F 3/0346* (2013.01); *G06F 1/1616* (2013.01); *G06F 1/1626* (2013.01); *G06F 1/1684* (2013.01);
(Continued)

(58) Field of Classification Search
CPC .................. G06F 3/0346; G06F 1/1626; G06F 2200/1637; G06F 1/1698; G06F 1/1684; G06F 1/1694; G06F 1/1616; G06F 2200/1636; G06F 2200/1614
See application file for complete search history.

(56) References Cited

U.S. PATENT DOCUMENTS 3,509,298 A 4/1970 Kirk
3,706,867 A 12/1972 Rand et al.
(Continued)

FOREIGN PATENT DOCUMENTS

EP 0658894 6/1995
GB 2378878 2/2003
(Continued)

OTHER PUBLICATIONS

Invitation to Pay Additional Fees, PCT Application No. PCT/US01/30387, 6 pages, May 27, 2002.
(Continued)

*Primary Examiner* — Andrew Sasinowski
(74) *Attorney, Agent, or Firm* — Brownstein Hyatt Farber Schreck, LLP

(57) ABSTRACT

Methods and apparatuses for operating a portable device based on an accelerometer are described. According to one embodiment of the invention, an accelerometer attached to a portable device detects a movement of the portable device. In response, a machine executable code is executed within the portable device to perform one or more predetermined user configurable operations. Other methods and apparatuses are also described.

17 Claims, 26 Drawing Sheets

Related U.S. Application Data application No. 10/986,730, filed on Nov. 12, 2004, now Pat. No. 7,688,306, which is a continuation-in-part of application No. 10/890,856, filed on Jul. 13, 2004, now Pat. No. 7,307,228, which is a continuation of application No. 10/348,465, filed on Jan. 21, 2003, now Pat. No. 6,768,066, which is a division of application No. 09/678,541, filed on Oct. 2, 2000, now Pat. No. 6,520,013, said application No. 12/645,457 is a continuation-in-part of application No. 10/791,495, filed on Mar. 1, 2004, now Pat. No. 7,218,226.

(52) U.S. Cl.
CPC .......... *G06F 1/1694* (2013.01); *G06F 1/1698* (2013.01); *G06F 2200/1614* (2013.01); *G06F 2200/1636* (2013.01); *G06F 2200/1637* (2013.01)

(56) References Cited

U.S. PATENT DOCUMENTS

| | | |
|---|---|---|
| 3,721,956 A | 3/1973 | Hamann et al. |
| 3,790,727 A | 2/1974 | Laserson et al. |
| 4,311,891 A | 1/1982 | Faust |
| 4,513,183 A | 4/1985 | Hill |
| 4,628,160 A | 12/1986 | Canevari |
| 4,833,281 A | 5/1989 | Maples |
| 4,862,302 A | 8/1989 | Ekhoff |
| 5,227,929 A | 7/1993 | Comerford |
| 5,317,304 A | 5/1994 | Choi |
| 5,434,371 A | 7/1995 | Brooks |
| RE35,269 E | 6/1996 | Comerford |
| 5,559,396 A | 9/1996 | Bruning et al. |
| 5,663,514 A | 9/1997 | Usa |
| 5,757,271 A | 5/1998 | Andrews |
| 5,789,716 A | 8/1998 | Wang |
| 5,824,904 A | 10/1998 | Kouhei et al. |
| 5,831,530 A | 11/1998 | Lace et al. |
| 5,955,712 A | 9/1999 | Zakutin |
| 5,957,697 A | 9/1999 | Iggulden et al. |
| 5,963,957 A | 10/1999 | Hoffberg |
| 5,982,573 A | 11/1999 | Henze |
| 5,986,690 A | 11/1999 | Hendricks |
| 6,002,963 A | 12/1999 | Mouchawar et al. |
| 6,028,275 A | 2/2000 | Jou |
| 6,044,299 A | 3/2000 | Nilsson |
| 6,046,877 A | 4/2000 | Kelsic |
| 6,091,930 A | 7/2000 | Mortimer et al. |
| 6,104,878 A | 8/2000 | Toguchi et al. |
| 6,133,830 A | 10/2000 | D'Angelo et al. |
| 6,150,947 A | 11/2000 | Shima |
| 6,160,540 A | 12/2000 | Fishkin et al. |
| 6,172,607 B1 | 1/2001 | McDonald |
| 6,185,485 B1 | 2/2001 | Ashrafi et al. |
| 6,199,874 B1 | 3/2001 | Galvin et al. |
| 6,201,554 B1 * | 3/2001 | Lands .................. G06F 1/1626 345/156 |
| 6,230,043 B1 | 5/2001 | Johnson |
| 6,230,047 B1 | 5/2001 | McHugh |
| 6,243,074 B1 | 6/2001 | Fishkin et al. |
| 6,262,769 B1 | 7/2001 | Anderson et al. |
| 6,294,995 B1 | 9/2001 | Patterson |
| 6,304,804 B1 | 10/2001 | DeBoni |
| 6,308,134 B1 | 10/2001 | Croyle et al. |
| 6,353,384 B1 | 3/2002 | Kramer |
| 6,359,560 B1 | 3/2002 | Budge et al. |
| 6,369,706 B1 | 4/2002 | Anderson et al. |
| 6,393,892 B1 | 5/2002 | Ohbayashi et al. |
| 6,407,876 B1 | 6/2002 | Yamaguchi et al. |
| 6,428,449 B1 | 8/2002 | Apseloff |
| 6,448,516 B1 | 9/2002 | Chiang |
| 6,453,266 B1 | 9/2002 | Chainer et al. |
| 6,466,821 B1 | 10/2002 | Pianca et al. |
| 6,472,864 B1 | 10/2002 | Emo et al. |
| 6,520,013 B1 | 2/2003 | Wehrenberg |
| 6,545,235 B1 | 4/2003 | Chou |
| 6,545,661 B1 | 4/2003 | Goschy et al. |
| 6,552,652 B2 | 4/2003 | Beken |
| 6,556,185 B2 | 4/2003 | Rekimoto |
| 6,559,396 B1 | 5/2003 | Chou |
| 6,559,767 B2 | 5/2003 | Huang |
| 6,580,579 B1 | 6/2003 | Hsin et al. |
| 6,618,683 B1 | 9/2003 | Berstis et al. |
| 6,634,207 B1 | 10/2003 | Lottman et al. |
| 6,649,905 B2 | 11/2003 | Grenlund |
| 6,650,940 B1 | 11/2003 | Zhu et al. |
| 6,658,292 B2 | 12/2003 | Kroll et al. |
| 6,679,118 B1 | 1/2004 | Esashi et al. |
| 6,747,632 B2 | 6/2004 | Howard |
| 6,765,489 B1 | 7/2004 | Ketelhohn |
| 6,768,066 B2 | 7/2004 | Wehrenberg |
| 6,769,497 B2 | 8/2004 | Dubinsky et al. |
| 6,778,348 B1 | 8/2004 | Carley |
| 6,877,074 B2 | 4/2005 | Naitoh et al. |
| 6,897,853 B2 | 5/2005 | Keely et al. |
| 6,933,923 B2 | 8/2005 | Feinstein |
| 6,940,407 B2 | 9/2005 | Miranda-Knapp et al. |
| 6,956,564 B1 | 10/2005 | Williams |
| 6,970,095 B1 | 11/2005 | Lee et al. |
| 6,977,675 B2 | 12/2005 | Kotzin |
| 7,159,194 B2 | 1/2007 | Wong et al. |
| 7,176,396 B1 | 2/2007 | Chou |
| 7,289,102 B2 | 10/2007 | Hinckley et al. |
| 7,351,925 B2 | 4/2008 | Wehrenberg |
| 7,456,823 B2 | 11/2008 | Poupyrev et al. |
| 7,521,623 B2 | 4/2009 | Bowen |
| 7,601,066 B1 | 10/2009 | Masuyama et al. |
| 7,688,306 B2 | 3/2010 | Wehrenberg et al. |
| 8,120,625 B2 | 2/2012 | Hinckley |
| 2001/0007980 A1 * | 7/2001 | Ishibashi .............. G06F 1/1626 705/14.4 |
| 2002/0021278 A1 | 2/2002 | Hinckley et al. |
| 2002/0140745 A1 * | 10/2002 | Ellenby .................. G01C 21/20 715/848 |
| 2002/0143489 A1 * | 10/2002 | Orchard .................. G01P 13/00 702/141 |
| 2002/0190947 A1 | 12/2002 | Feinstein |
| 2002/0193080 A1 * | 12/2002 | Komsi .................. G06F 3/0233 455/575.1 |
| 2003/0028688 A1 * | 2/2003 | Tiphane .................. G02B 27/20 710/1 |
| 2003/0076343 A1 | 4/2003 | Fishkin et al. |
| 2003/0085870 A1 | 5/2003 | Hinckley |
| 2003/0103091 A1 | 6/2003 | Wong et al. |
| 2003/0138763 A1 | 7/2003 | Roncalez et al. |
| 2004/0008191 A1 * | 1/2004 | Poupyrev ................ G06F 3/011 345/184 |
| 2004/0027330 A1 | 2/2004 | Bradski |
| 2004/0125085 A1 | 7/2004 | Kotzin |
| 2004/0252397 A1 | 12/2004 | Hodge et al. |
| 2012/0117464 A1 * | 5/2012 | Koshimizu .......... G06F 1/1626 715/255 |

FOREIGN PATENT DOCUMENTS

| | | |
|---|---|---|
| GB | 2379987 | 3/2003 |
| JP | 10240434 | 9/1989 |
| JP | H0650758 | 2/1994 |
| JP | H0944143 | 2/1997 |
| JP | 10254614 | 9/1998 |
| JP | 2001036628 | 2/2001 |
| JP | 2001038052 | 2/2001 |
| JP | 2001057011 | 2/2001 |
| JP | 2001170358 | 6/2001 |
| JP | 2001204967 | 7/2001 |
| JP | 2001274612 | 10/2001 |
| JP | 2001299980 | 10/2001 |
| JP | 2001333156 | 11/2001 |
| JP | 2002171316 | 6/2002 |
| JP | 2002189567 | 7/2002 |

(56) References Cited

FOREIGN PATENT DOCUMENTS

| | | |
|---|---|---|
| JP | 2002297284 | 10/2002 |
| JP | 3090045 | 11/2002 |
| JP | 2002368850 | 12/2002 |
| JP | 2003005879 | 1/2003 |
| JP | 2003019348 | 1/2003 |
| JP | 2003088682 | 3/2003 |
| JP | 2003163956 | 6/2003 |
| JP | 2003521168 | 7/2003 |
| JP | 2003325972 | 11/2003 |
| JP | 2003345492 | 12/2003 |
| WO | WO 00/39602 | 7/2000 |
| WO | WO00/68766 | 11/2000 |
| WO | WO01/86920 | 11/2001 |
| WO | WO03/001340 | 1/2003 |
| WO | WO03/076023 | 9/2003 |

OTHER PUBLICATIONS

International Search Report, PCT Application No. PCT/US01/30387, 8 pages, Sep. 19, 2002.
Written Opinion, PCT Application No. PCT/US01/30387, 6 pages, May 27, 2004.
Preliminary Examination Report, PCT Application No. PCT/US01/30387, 7 pages, Jan. 18, 2005.
Invitation to Pay Additional Fees, PCT Application No. PCT/US2005/003599, 8 pages, Jan. 12, 2006.
International Search Report and Written Opinion, PCT Application No. PCT/US2005/003599, 23 pages, Mar. 3, 2006.
Preliminary Report on Patentability, PCT Patent Application No. PCT/US2005/003599, 13 pages, Sep. 14, 2006.

* cited by examiner

METHODS AND APPARATUSES FOR OPERATING A PORTABLE DEVICE BASED ON AN ACCELEROMETER

RELATED APPLICATIONS

This application is a continuation of U.S. patent application Ser. No. 12/645,457, filed on Dec. 22, 2009, which is a divisional of U.S. patent application Ser. No. 10/986,730, filed on Nov. 12, 2004, now U.S. Pat. No. 7,688,306, which is a continuation-in-part (CIP) of U.S. patent application Ser. No. 10/890,856, filed on Jul. 13, 2004, now U.S. Pat. No. 7,307,228, which is a continuation of U.S. patent application Ser. No. 10/348,465, filed on Jan. 21, 2003, now U.S. Pat. No. 6,768,066, which is a divisional application of U.S. patent application Ser. No. 09/678,541, filed on Oct. 2, 2000, now U.S. Pat. No. 6,520,013.

U.S. patent application Ser. No. 12/645,457 is also a continuation-in-part (CIP) of U.S. patent application Ser. No. 10/791,495, filed Mar. 1, 2004, now U.S. Pat. No. 7,218,226. The above-identified U.S. patent applications are hereby incorporated by reference.

FIELD OF THE INVENTION

The present invention relates generally to a portable device. More particularly, this invention relates to operating a portable device using an accelerometer of the portable device.

BACKGROUND OF THE INVENTION

Accelerometers are devices widely used for applications as diverse as vibration monitoring, appliance control, joysticks, industrial process control, space launches, satellite control, and many others. For example, an accelerometer has been used in a vehicle as sensor to detect a variety of operating conditions while the vehicle is moving.

As computers have been getting more popular, an accelerometer has been used in a computer to sense a sudden move, such as a free fall, of a computer. A typical application of an accelerometer in a computer is to protect a read/write head of a hard drive. However, there has been a lack of applications that an accelerometer is used in conjunction with software executable within a computer.

SUMMARY OF THE INVENTION

Methods and apparatuses for operating a portable device based on an accelerometer are described. According to one embodiment of the invention, an accelerometer attached to a portable device detects a movement of the portable device. In response, a machine executable code is executed to perform a predetermined user configurable operation.

According to one embodiment of the invention, an accelerometer of a portable device may constantly or periodically monitor the movement of the portable device. As a result, an orientation of the portable device prior to the movement and after the movement may be determined based on the movement data provided by the accelerometer attached to the portable device.

According to another embodiment of the invention, an accelerometer may be used to detect a movement of a portable device as a way to trigger whether a page of document or image may be displayed.

According to another embodiment of the invention, an accelerometer may be used in a navigation application. For example, a portable device having an accelerometer attached therein may be used as a navigation tool to navigate a relatively large object or document that normally cannot be displayed entirely at once within a display of the portable device.

According to another embodiment of the invention, an accelerometer may be used in a gaming application, where the accelerometer may be used to detect a scene change during a video game running within a portable device.

According to another embodiment of the invention, an accelerometer may be used to detect a movement of a portable device and an orientation of the portable device may be determined based on the movement data provided by the accelerometer. Thereafter, one or more interfaces of the portable device may be activated or deactivated based on the determined orientation after the movement.

According to another embodiment of the invention, an accelerometer may be used to detect and determine activities of a user (e.g., joggling) with a portable device having the accelerometer attached therein.

According to another embodiment of the invention, an accelerometer may be used to determine whether a portable device is moving (e.g., carried by a user) and the portable device should be put in a proper operating state (e.g., a sleep or hibernated mode).

According to another embodiment of the invention, an accelerometer may be used to detect whether a portable device is moved according to certain directions, in order to determine whether a password is entered correctly.

According to another embodiment of the invention, an accelerometer may be used to detect and record a sequence of movements of a portable device, where the recorded movement data may be used to recreate the moving history subsequently (e.g., off line).

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
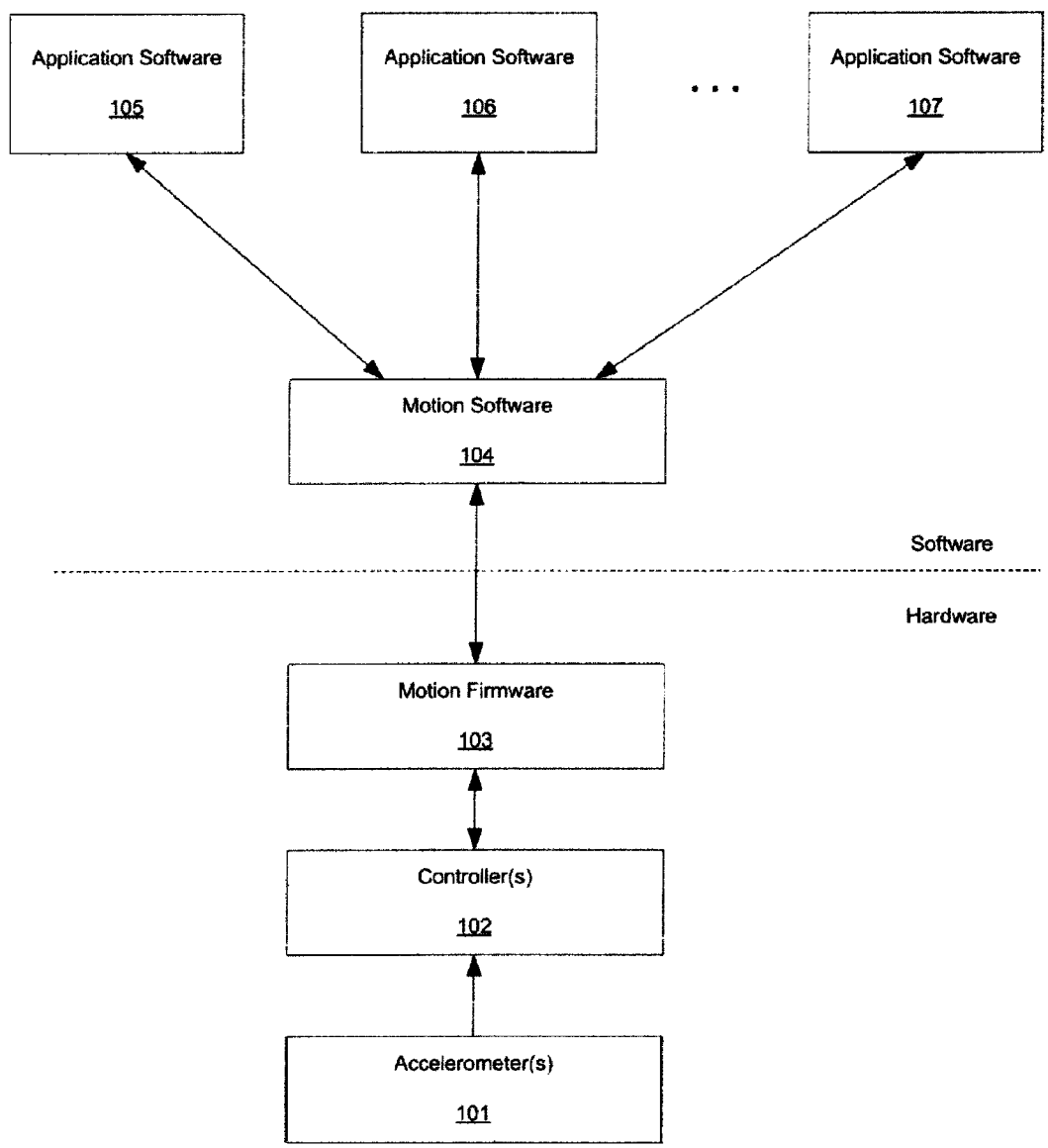
FIG. 1 is a block diagram illustrating an exemplary architecture of a portable device according to one embodiment of the invention.

Methods and apparatuses for operating a portable device based on an accelerometer are described. According to certain embodiments, an accelerometer has been used within a portable device, such as, for example, a laptop computer, a tablet PC, a personal digital assistant (PDA), a cellular phone, and a digital multimedia player, etc. Once the accelerometer detects a movement of the portable device, a moving direction, also referred to as a moving vector or an acceleration vector, is determined based on the movement data provided by the accelerometer. The moving direction and/or the movement data may be provided to a software component (e.g., application software) executed within the portable device. In response to the detection of the movement of the portable device, the corresponding software component performs one or more predetermined user configurable actions, such as, for example, advancing a page of document, etc., based on the moving direction and/or movement data provided by the accelerometer.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

FIG. 1 is a block diagram illustrating an exemplary architecture of a portable device according to one embodiment of the invention. In one embodiment, the exemplary system 100 includes, but is not limited to, a processor, a memory coupled to the processor, the memory having instructions stored therein, and an accelerometer coupled to the processor and the memory to detect movement of the portable device, where the processor executes instructions from the memory to perform one or more predetermined user configurable actions in response to the detection of the movement of the portable device. In an alternative embodiment, the exemplary system 100 further includes a controller coupled to the accelerometer to determine a direction of the movement based on movement data provided by the accelerometer and to compare the determined direction of the movement with a predetermined direction to determine whether the determined direction relatively matches the predetermined direction in order to execute the instructions.

Referring to FIG. 1, according to one embodiment, exemplary system 100 includes one or more accelerometers 101, one or more controllers 102 coupled to the accelerometers 101, a motion related firmware 103, motion software component 104, and one or more application software 105-107. The accelerometer 101 may be attached to the portable device, such as, for example, a motherboard of the portable device. Alternatively, the accelerometer 101 may be integrated with another component of the portable device. For example, the accelerometer 101 may be integrated with a chipset of the portable device.

According to one embodiment, the accelerometer 101 is able to detect a movement including an acceleration and/or de-acceleration of the portable device. The accelerometer 101 may generate movement data for multiple dimensions, which may be used to determine a moving direction of the portable device. For example, the accelerometer 101 may generate X, Y, and Z axis acceleration information when the accelerometer 101 detects that the portable device is moved. In one embodiment, the accelerometer 101 may be implemented as those described in U.S. Pat. No. 6,520,013, which is assigned to a common assignee of the present application. Alternatively, the accelerometer 101 may be implemented using a variety of accelerometers commercially available. For example, the accelerometer 101 may be a KGF01 accelerometer from Kionix or an ADXL311 accelerometer from Analog Devices.

In addition, the exemplary system 100 includes one or more controllers 102 coupled to the accelerometer(s) 101. The controller 102 may be used to calculate a moving direction, also referred to as moving vector, of the portable device. The moving vector may be determined according to one or more predetermined formulas based on the movement data (e.g., X, Y, and Z axis moving information) provided by the accelerometer 101. Certain embodiments of calculations of a moving vector will be described in details further below.

According to one embodiment, the controller 102 is responsible for monitoring one or more outputs of the accelerometer 101 and communicating with other components, such as, for example, a chipset (e.g., a memory controller or a north bridge) and/or a microprocessor (e.g., a CPU), of the portable device. The controller 102 may be implemented using a variety of microcontrollers commercially available. For example, controller 102 may be a PIC 16F818 microcontroller from Microchip. Controller 102 may be integrated with the accelerometer 101. Alternatively, controller 102 may be integrated with other components, such as, for example, a chipset or a microprocessor, of the portable device.

In one embodiment, the controller 102 may communicate with other components via a bus, such as, for example, an I2C (inter-IC) bus, and an interrupt line. In response to the movement data, the controller 102 generates an interrupt, for example, a hardware interrupt, a software interrupt, or a combination of both, via an interrupt line to other components, such as, firmware 103, to notify them of such a movement. In addition, the controller 102 may further calculate a moving vector based on the movement data provided by the accelerometer 101. Further detailed information concerning the communications between the controller 102 and other components of the portable device will be described further below.

Referring back to FIG. 1, motion firmware 103 includes one or more pieces of machine executable code, which may be embedded within one or more hardware components, such as, for example, controller 102 or a chipset (e.g., a part of BIOS, also referred to as basic input/output system), of the portable device. In one embodiment, motion firmware 103 may be stored in a read-only memory (ROM) (e.g., a flash memory) of controller 102. However, the machine executable code of motion firmware 103 may be upgraded by uploading a newer version into the memory, for example, using a flash utility. The firmware 103 may be responsible for detecting any events that are generated in response to the movement detection. According to one embodiment, the firmware 103 provides a primary communications mechanism between controller 102 and other components, such as, for example, an operating system (OS), of the portable device.

Motion software 104 may be responsible for communicating between the motion firmware 103 and the rest of software components, such as application software components 105-107, as well as the operating system. In one embodiment, the motion software 104 may be implemented as a part of an operating system, such as, for example, a kernel component or a device driver, etc. The operating system may be implemented using a variety of operating systems commercially available. For example, the operating system may be a Mac OS from Apple Computer. Alternatively, the operating system may be a Windows operating system from Microsoft. Other operating systems, such as, for example, a Unix, a Linux, an embedded operating system (e.g., a Palm OS), or a real-time operating system, may also be implemented.

According to one embodiment, in response to the motion detection event, which may be notified by the motion firmware 103, the motion software component 104 may communicate the event to one or more application software 105-107. In response to the detection, the application software 105-107 may perform certain operations. The applications 105-107 may be a variety of different applications, such as, for example, a browser, a word processor, a slide presentation, etc. Certain embodiments of the operations performed by the applications 105-107 will be described in details further below.

Figure 2:
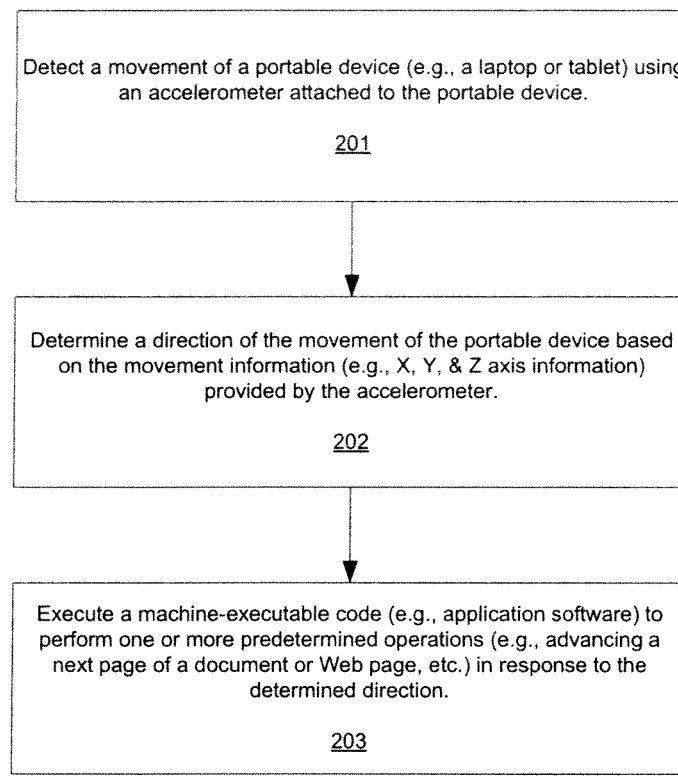
FIG. 2 is a flow diagram illustrating an exemplary process for operating a portable device in response to an event generated by an accelerometer, according to one embodiment of the invention.

FIG. 2 is a flow diagram illustrating an exemplary process for operating a portable device in response to an event generated by an accelerometer, according to one embodiment of the invention. Exemplary process 200 may be performed by a processing logic that may comprise hardware (circuitry, dedicated logic, etc.), software (such as is run on a dedicated machine), or a combination of both. In one embodiment, exemplary process 200 includes, but is not limited to, detecting movement of a portable device using an accelerometer attached to the portable device, and executing machine-executable code to perform one or more predetermined user configurable actions in response to the detection of the movement of the portable device.

Referring to FIG. 2, at block 201, a movement of a portable device, such as, for example, a laptop computer or a tablet PC, is detected using an accelerometer (e.g., accelerometer 101 of FIG. 1) attached to the portable device. In one embodiment, in response to the detection, the accelerometer may generate movement data for multiple dimensions (e.g., X, Y, and Z axes). In response to the detection, at block 202, a direction of the movement is determined based on the movement data provided by the accelerometer. In one embodiment, the direction of the movement is determined by a controller (e.g., controller 102 of FIG. 1). In response to the determined direction, at block 203, one or more machine executable code (e.g., application software) may be executed to perform one or more predetermined user configurable actions, such as, for example, advancing a Web page, etc. Other operations may also be performed.

Determining Orientation Based on an Accelerometer

According to one embodiment of the invention, an accelerometer of a portable device may constantly or periodically monitor the movement of the portable device. As a result, an orientation of the portable device prior to the movement and after the movement may be determined based on the movement data provided by the accelerometer attached to the portable device.

Figure 3A:
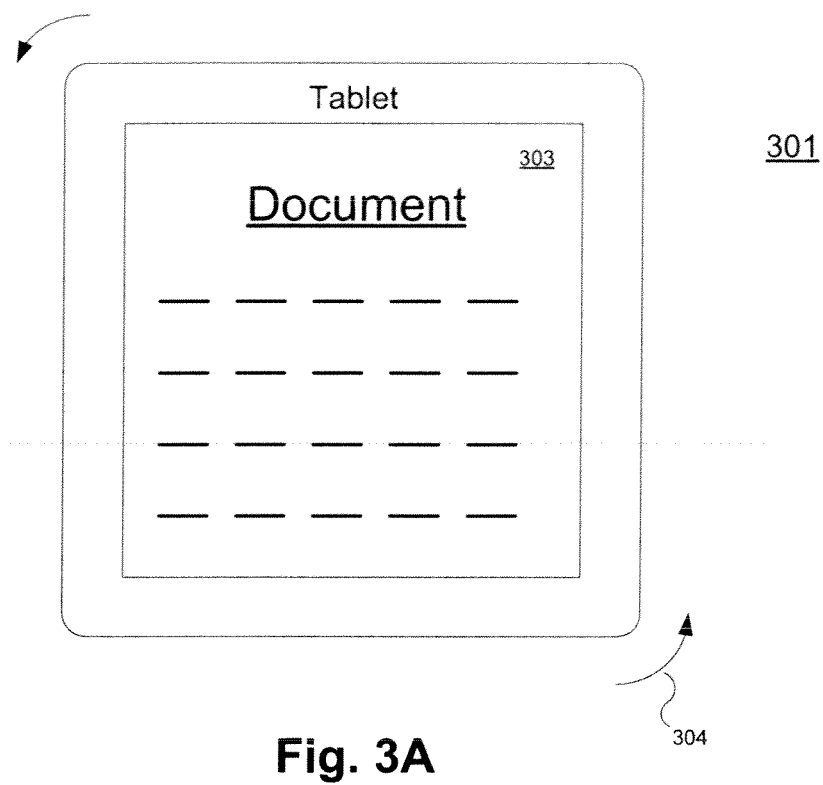
FIGS. 3A and 3B are diagrams illustrating an exemplary application that an accelerometer may be utilized according to one embodiment of the invention.
Figure 3B:
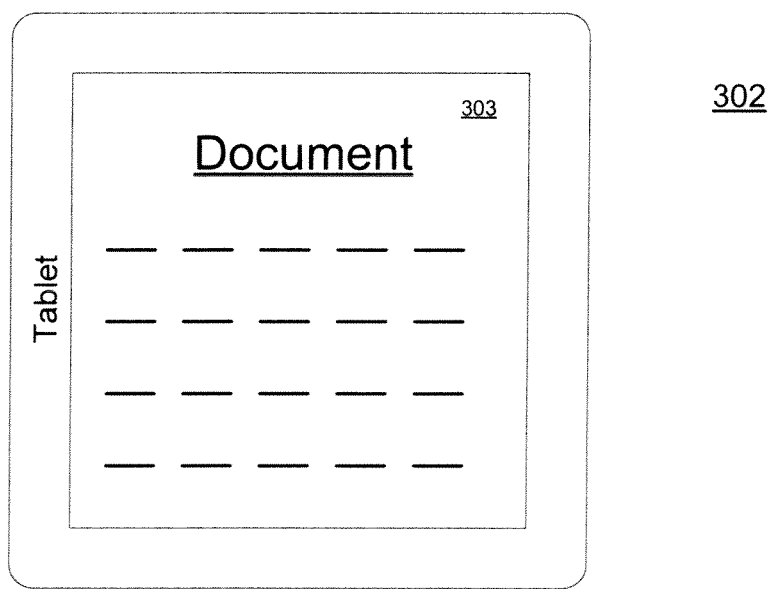

FIGS. 3A and 3B are diagrams illustrating an exemplary application that an accelerometer may be utilized according to one embodiment of the invention. In this embodiment, and throughout the application, a tablet device is used as an example of a portable device. But it is not so limited. It will be appreciated that other portable devices, such as, a laptop computer, a personal digital assistant (PDA), a personal communicator (e.g., a blackberry from Research In Motion), a cellular phone, or a multimedia player (e.g., an MP3 player), etc., may also be utilized.

Referring to FIGS. 3A and 3B, initially according to one embodiment, the portable device is in an orientation 301 having a page of document 303 displayed within a display of the portable device. In the orientation 301, the document page 303 is displayed properly from a viewpoint of a user facing the display given the orientation 301, which may be detected and determined by an accelerometer and a controller associated with it, periodically or constantly.

When the portable device is moved, for example, according to a moving direction 304, which ends up with an orientation 302, the accelerometer (accelerometer 101 of FIG. 1) may detect such a movement. In response to the detection, the controller (e.g., controller 102 of FIG. 1) may determine a moving direction based on the movement data provided by the accelerometer and notify the appropriate components of the portable device, such as, firmware 103, motion software 104, and/or applications 105-107 of FIG. 1. Such a notification may be performed via an interrupt or by pulling one or more registers of the controller and/or accelerometer. In addition, the controller may further determine an orientation of the portable device after the movement.

In response to the notification, according to one embodiment, the orientation of the document page 303 may be adjusted in accordance with the determined orientation after the movement, as shown in FIG. 3B. In one embodiment, the orientation of the displayed document page may be adjusted after the movement to be relatively identical to the orientation prior to the movement. As a result, even though the orientation of the portable device has changed, the orientation of the displayed document page remains relatively the same, particularly, in a viewpoint of a user facing the display of the portable device.

In this embodiment, the adjustment of the orientation of the document page 303 may be performed by a display driver (e.g., a video driver) that transmits the displayed data (e.g., the document page) to a display of the portable device. Alternatively, the adjustment of the orientation may be performed by the original application software (e.g., applications 105-107 of FIG. 1) that provides the document page 303 (e.g., a browser that provides a Web page or a word processor that provides a page of a document). Note that the moving direction 304 shown in FIGS. 3A and 3B is for illustration purposes only. Other moving directions, such as those or a combination of those shown in FIG. 5A, may also be implemented. Further, as shown in FIGS. 3A and 3B, the portable device is rotated left in 90 degrees for the illustration purposes only. The portable device may be rotated, moved in parallel, or a combination of both or multiple dimensions and in any moving step sizes.

Figure 4:
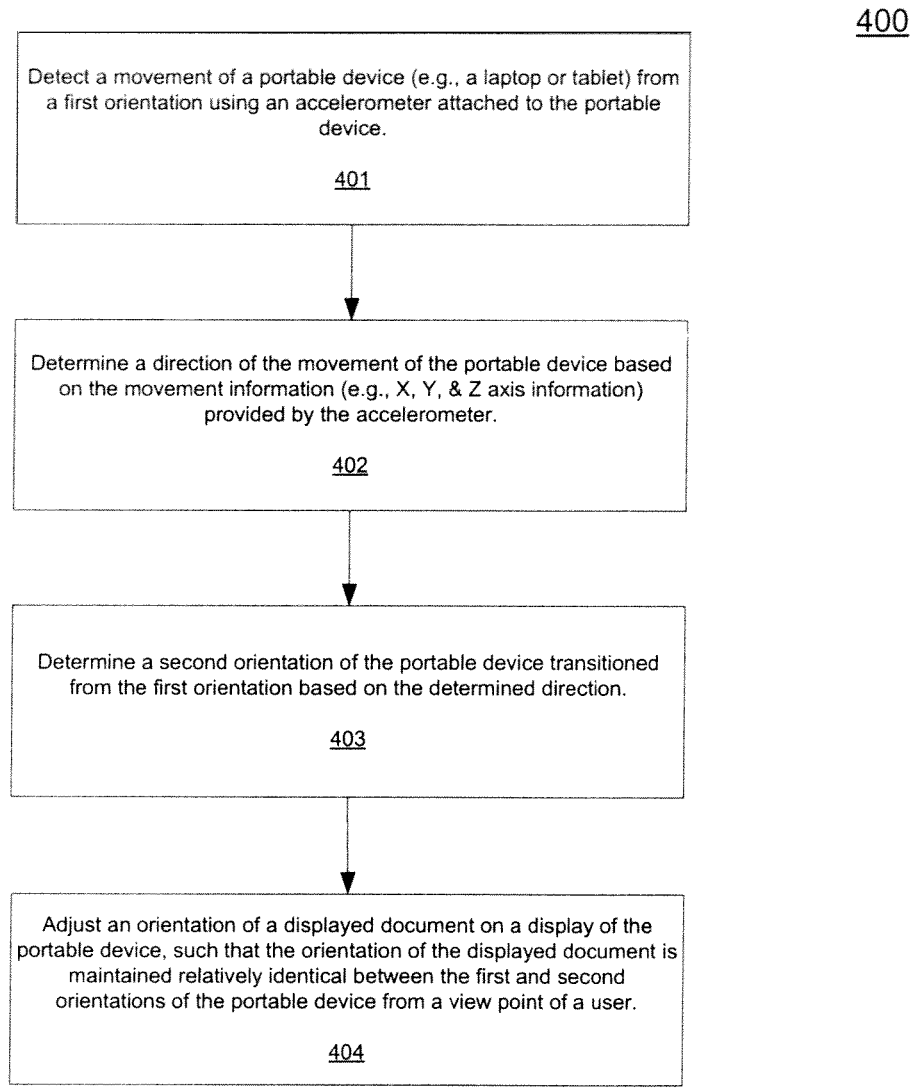
FIG. 4 is a flow diagram illustrating an exemplary processor for reorienting a displayed document based on an accelerometer, according to one embodiment of the invention.

FIG. 4 is a flow diagram illustrating an exemplary processor for reorienting a displayed document based on an accelerometer, according to one embodiment of the invention. Exemplary process 400 may be performed by a processing logic that may comprise hardware (circuitry, dedicated logic, etc.), software (such as is run on a dedicated machine), or a combination of both. In one embodiment, exemplary process 400 includes, but is not limited to, detecting movement of a portable device using an accelerometer attached to the portable device, determining an orientation of the portable device after the movement based on movement data provided by the accelerometer, and displaying an image on a display of the portable device according to an orientation that is relatively identical to an orientation of the image prior to the movement.

Referring to FIG. 4, at block 401, a movement of a portable device from a first orientation is detected using an accelerometer attached to the portable device. In response, at block 402, a moving direction is determined based on movement data, such as X, Y, and Z axis information, provided by the accelerometer. In one embodiment, the determination may be performed by a controller coupled to the accelerometer (e.g., controller 102 of FIG. 1). The moving direction may be determined according to one or more predetermined formulas. At block 403, after the movement, a second orientation of the portable device may be determined based on the movement data provided by the accelerometer. At block 404, an orientation of a displayed document page may be adjusted based on the determined second orientation. In one embodiment, the orientation of the displayed document page may be adjusted such that the adjusted orientation of the document page is relatively identical to the orientation prior to the movement, particularly, from a viewpoint of a user. Other operations may also be performed.

Displaying Different Pages of a Document Based on an Accelerometer

According to another embodiment of the invention, an accelerometer may be used to detect a movement of a portable device as a way to trigger whether a page of document or image may be displayed. For example, when a portable device is moved (e.g., a sudden move) towards a predetermined direction, the accelerometer may detect such a movement and application software may display a particular page in response to the detection of the movement.

Figure 5A:
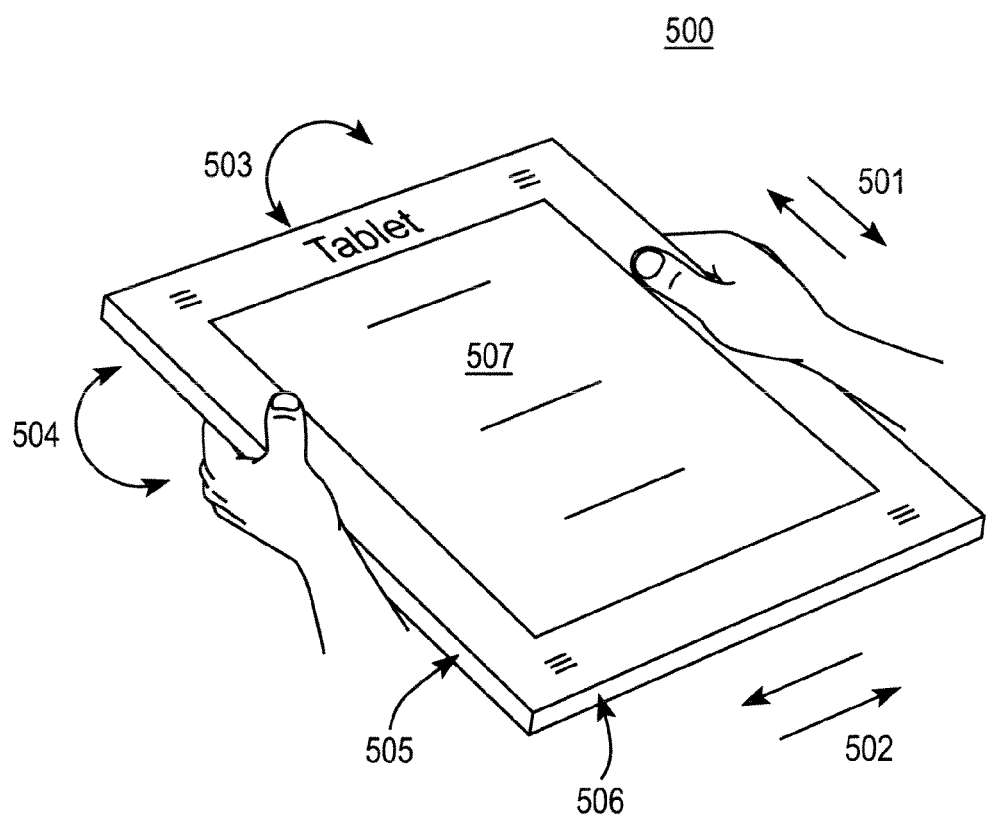
FIGS. 5A and 5B are diagrams illustrating exemplary movements of a portable device that may be used to trigger displaying a page of document, according to certain embodiments of the invention.

FIG. 5A is a diagram illustrating exemplary movements of a portable device that may be used to trigger displaying a page of document, according to one embodiment of the invention. For example, referring to FIG. 5A, a first page of document is displayed on a display 507 of the portable device 500. When the portable device 500 is moved in certain directions, an accelerometer (e.g., accelerometer 101 of FIG. 1) attached to the portable device 500 may detect such a movement. In response to the detection, the accelerometer may notify, via the associated controller, firmware, and/or OS, other components such as application software, particularly the one providing the first page of document being displayed.

In a particular embodiment, the accelerometer may notify a controller (e.g., controller 102 of FIG. 1) including providing the movement data (e.g., X, Y, and Z axes). The controller and/or the firmware may calculate the moving vector of the movement based on the movement data provided by the accelerometer. Thereafter, the controller may signal other components, such as motion software component (e.g., motion software 104) and/or the operating system. The motion software and/or the operating system may compare the moving vector with a predetermined direction to determine whether the moving vector relatively matches the predetermined direction, for example, based on a predetermined threshold.

In one embodiment, the predetermined direction and the threshold (e.g., sensitivity) associated with the predetermined direction may be user configurable via a user interface. Such a sensitivity may be configured based on different profiles associated with the portable device at a given time and place. For example, the sensitivity of the portable device may be different when it is at a home/office versus on a moving platform (e.g., a car, a train, a ship or an airplane, etc.) In a further embodiment, the portable device may include a mechanism to intelligently filter out some "noisy" movement background.

If the moving vector relatively matches the predetermined direction, the associated application software may be notified. In response, the associated application software may perform certain operations, including displaying a second page different than the first page on the display.

In one embodiment, the second page of the document may be a next page or a previous page of the document. The document may be a word document produced by a word processor, such as, a word processor from Microsoft Office. Alternatively, the document may be a Web page presented by a browser, such as, Internet Explorer from Microsoft or a Netscape communicator from Netscape Communications. Further, the document may be a slide presentation, for example, presented by PowerPoint of Microsoft or by Keynote of Apple Computer.

Referring to FIG. 5A, the moving directions may include a moving direction that is parallel with a surface of the portable device (e.g., a display surface 507 of the portable device) as shown as directions 501 and 502. Alternatively, the moving directions may include a rotation of the portable device with respect to an axis parallel with an edge (e.g., edges 505 and 506) of the portable device, as shown as directions 503 and 504. Furthermore, the moving directions of the portable device may be a combination of the above directions. For example, the movement may be multiple dimension spin with respect to a corner of the portable device 500. Other types of the movements may be utilized.

Figure 5B:
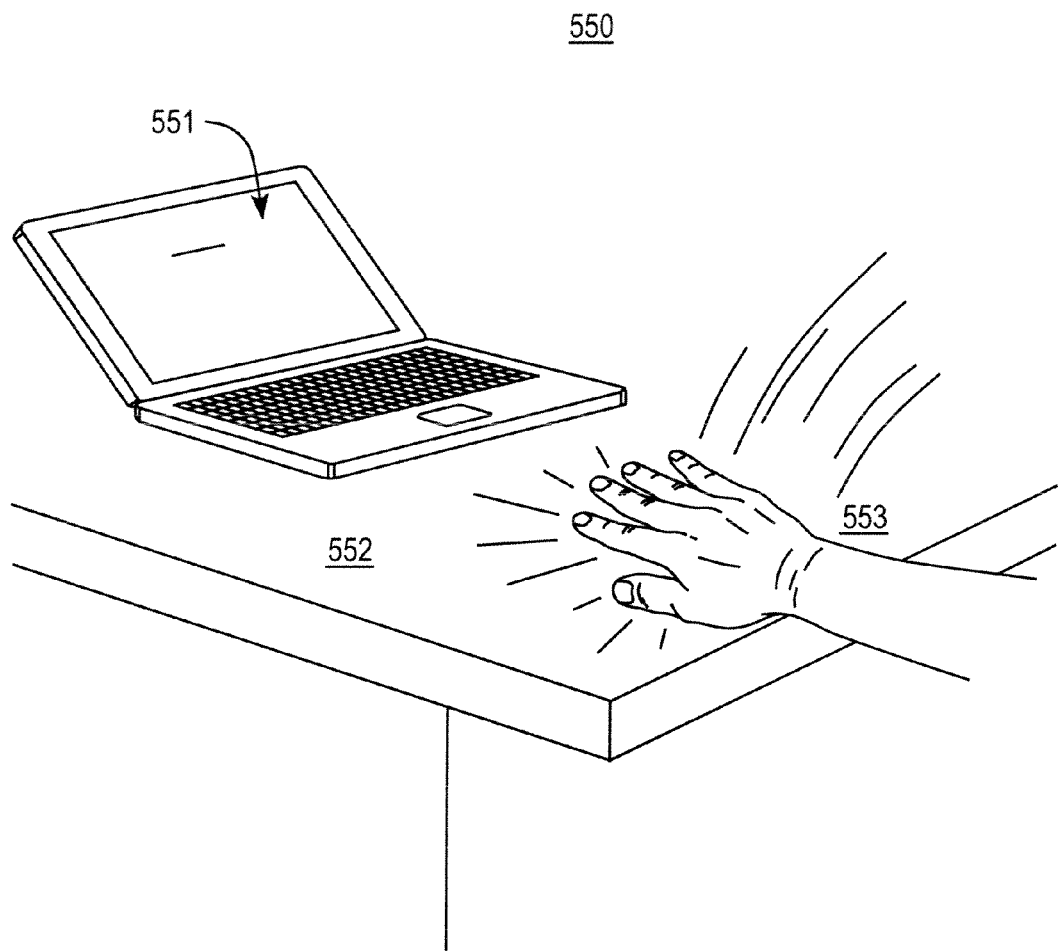

FIG. 5B is a diagram illustrating an exemplary movement of a portable device that may be used to trigger displaying a page of document, according to an alternative embodiment of the invention. In this embodiment, the portable device 551 may be placed on a supporting surface 552. In addition, the application software running within the portable device 551 may be configured as in a "default" mode. When a sudden force is applied to the supporting surface 552, the sudden force causes an oscillation of the supporting surface 552. The sudden force may be provided by a user tabbing the supporting surface.

In response to the oscillation of the supporting surface 552, an accelerometer attached to the portable device 551 may detect such an oscillation. In response to the detection, the accelerometer may notify, via the firmware and/or the controller, etc., the associated application software. In response, the application software may display a next page, a previous page, or a specific page of the document, which may be user configurable via a user interface. It is particularly useful when the portable device is placed on a desk and hooked up with a presentation projector. A user who is doing the presentation may simply tab on the desk to advance a next page of presentation without having to press a key of a keyboard (e.g., the "Enter" key or the space bar) or a mouse of the portable device.

Figure 6:
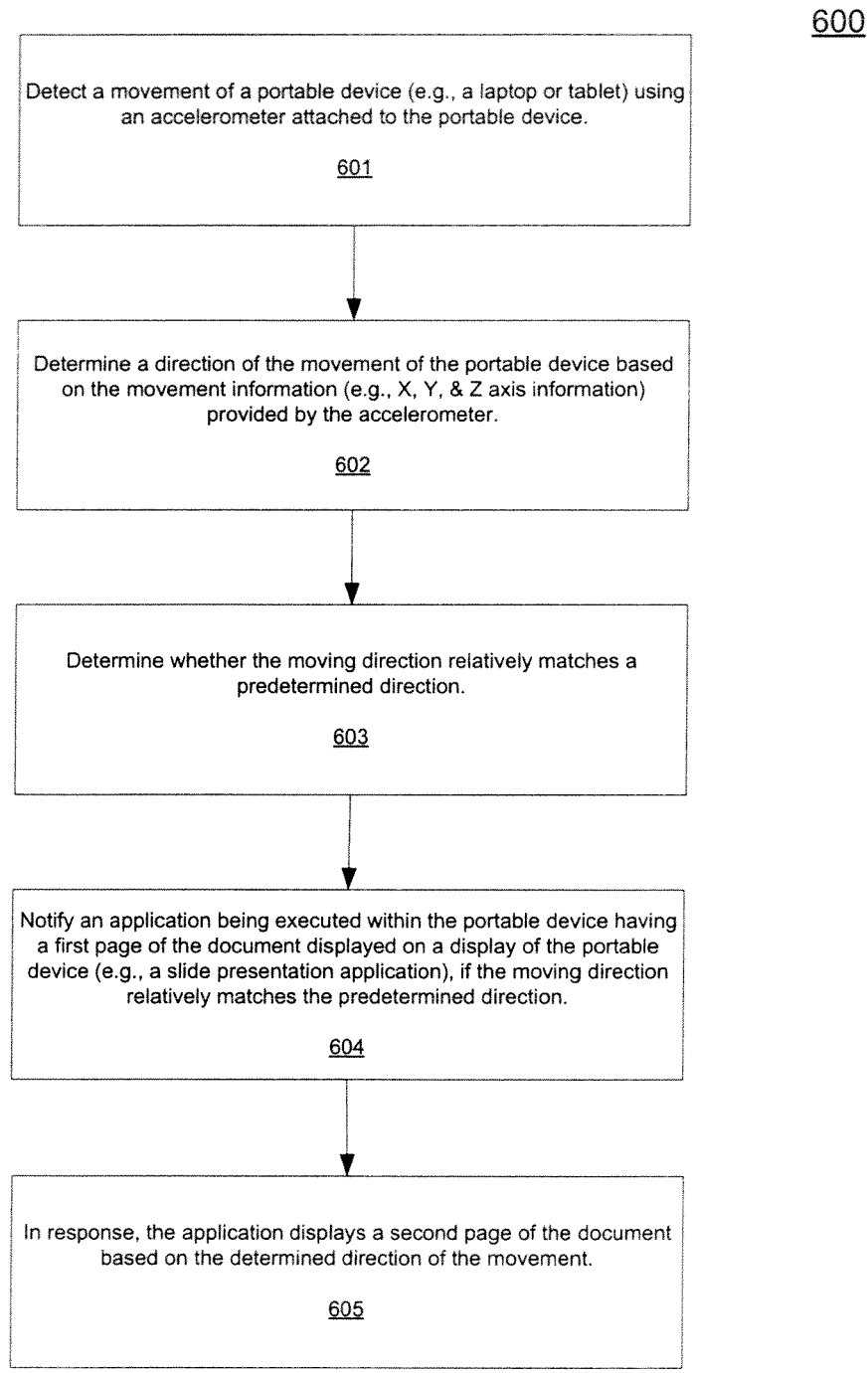
FIG. 6 is a flow diagram illustrating an exemplary process for presenting a document based on an accelerometer according to one embodiment of the invention.

FIG. 6 is a flow diagram illustrating an exemplary process for presenting a document based on an accelerometer according to one embodiment of the invention. Exemplary process 600 may be performed by a processing logic that may comprise hardware (circuitry, dedicated logic, etc.), software (such as is run on a dedicated machine), or a combination of both. In one embodiment, exemplary process 600 includes, but is not limited to, displaying a first page of a document on a display of a portable device, detecting movement of the portable device using an accelerometer attached to the portable device, and displaying a second page of the document different than the first page in response to the detection of the movement.

Referring to FIG. 6, at block 601, a movement of a portable device is detected using an accelerometer attached to the portable device. In response to the detection, at block 602, a moving direction of the movement is determined based on the movement data provided by the accelerometer, for example, X, Y, Z, axis information. In one embodiment, the moving direction may be determined by the associated controller and/or the associated firmware. At block 603, it is determined whether the moving direction relatively matches a predetermined direction. If so, at block 604, associated application software being executed within the portable device having a first page of a document displayed is notified. In response, at block 605, the application software displays a second page of the document different than the first page. Other operations may also be performed.

Navigation Applications Based on an Accelerometer

According to another embodiment of the invention, an accelerometer may be used in a navigation application. For example, a portable device having an accelerometer attached therein may be used as a navigation tool to navigate a relatively large object or document that normally cannot be displayed entirely at once within a display of the portable device.

Figure 7A:
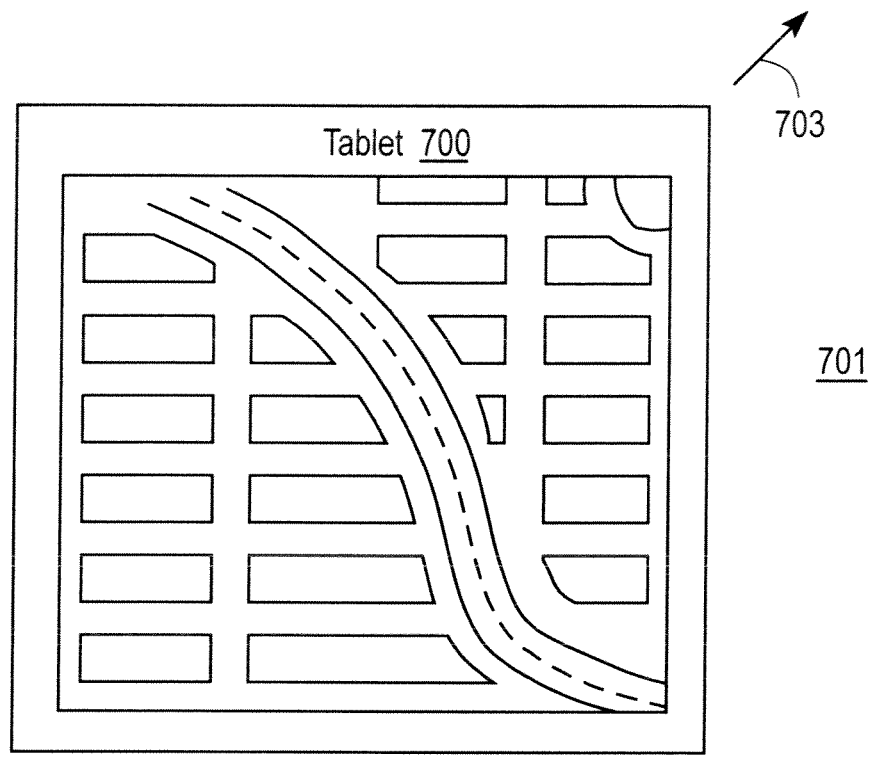
FIGS. 7A and 7B are diagrams illustrating an exemplary navigation application based on an accelerometer according to one embodiment of the invention.
Figure 7B:
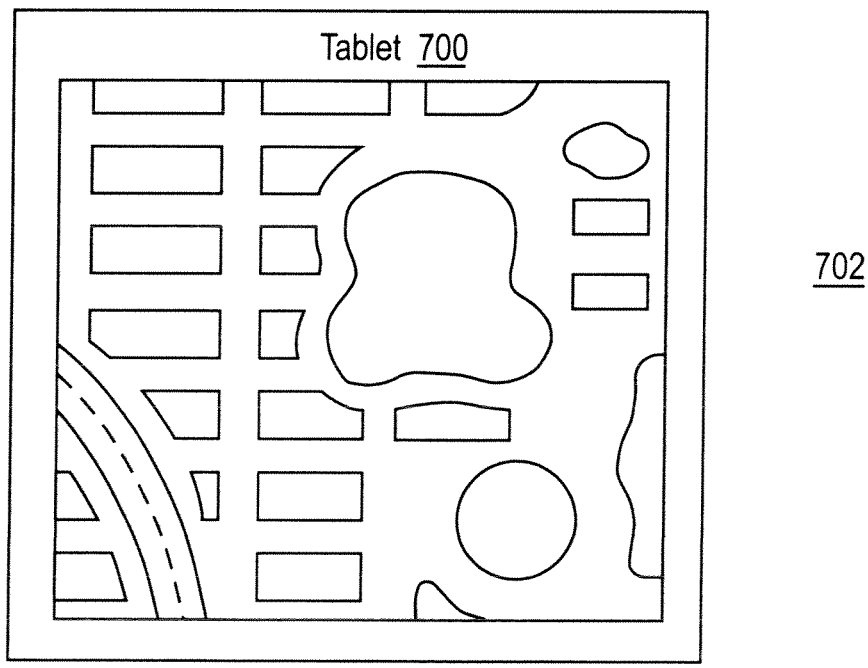

FIGS. 7A and 7B are diagrams illustrating an exemplary navigation application based on an accelerometer according to one embodiment of the invention. In this embodiment, a portion of a map is displayed initially as shown in FIG. 7A. The map normally cannot be displayed entirely as a whole within a display of the portable device 700 with a certain detail level. For example, when a user "zoom in" on a map, only a portion of the map can be displayed within the display. As the user navigates throughout a first portion of the map, the user may wish to gradually navigate into a second portion of the map from the first portion.

According to one embodiment, a user holding the portable device 700 may move the portable device 700 towards a direction that the user wishes to navigate, for example, in accordance with direction 703 (e.g., northeast direction as an example). In response to the movement, an accelerometer attached to the portable device 700 may detect such a movement. The accelerometer may provide movement data (e.g., X, Y, and Z, axis information) to a controller and/or firmware of the portable device. The associated controller and/or firmware may calculate a moving direction and/or moving distance based on the movement data provided by the accelerometer, using one or more predetermined formulas. Thereafter, the controller and/or firmware may communicate the moving direction to the associated application software that is currently providing the map.

In response, the application software may determine the second portion of the map based on the moving direction, moving distance, and/or moving acceleration data provided by the controller and/or firmware. The application software then displays the second portion accordingly. As a result, the user does not have to press and/or click a button in order to navigate other portions of the map. Note that the moving direction 703 is shown for the illustration purposes only. Any other directions may be applied.

In one embodiment, the second portion of the map may be displayed via a transition from the first portion. That is, multiple intermediate portions between the first and second portions may be sequentially displayed to form a transition from the first portion to the second portion. As a result, the second portion "comes into" the display of the portable device gradually. According to one embodiment, the transition from the first portion to the second portion is displayed as if the user moves the portable device on a relatively large map, while the map remains steady. In this embodiment, the transition is displayed as if the user holds the portable device as a magnifier to navigate a large map, a large newspaper, or a Web page, etc.

According to a further embodiment, certain movements may be used to "zoom in" or "zoom out" on the displayed page. For example, while a movement parallel to a surface (e.g., a display surface) of the portable device may be used to navigate different portions of the displayed page, a rotation of the portable device may be used to zoom in or zoom out on the displayed page, which may change the resolution of the displayed page. For example, a user may tilt up the portable device as a way to zoom out and may tilt down the portable device as a way to zoom in. Other moving directions, such as those or a combination of those shown in FIG. 5A, may also be utilized.

According to another embodiment, the techniques described above may be used in a virtual reality environment. In one embodiment, it allows a user to use the accelerometer equipped portable display device as a portable and controllable window into a virtual reality image database. For example, a user holding the tablet can turn around and see the view looking backwards from a position in a two or three dimensional image or object database as if the user walks into a virtual reality game space. According to another embodiment, a user may perform an inspection of an image panorama where the view in different directions is provided by multiple cameras pointing outward in different directions from a single location.

Figure 8:
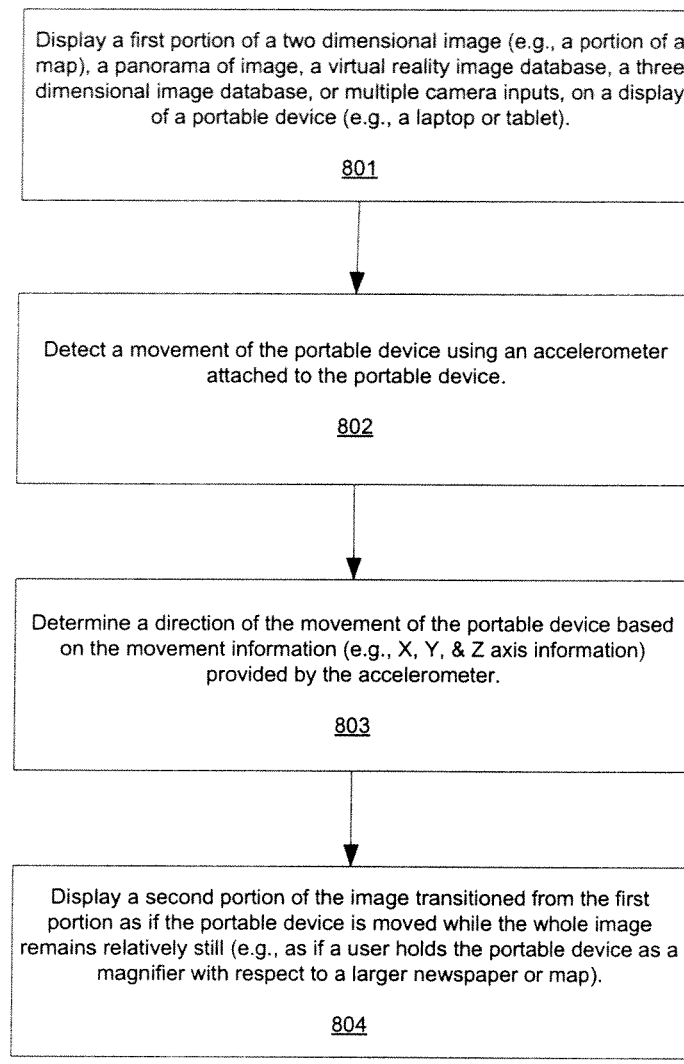
FIG. 8 is a flow diagram illustrating an exemplary process for navigating an image based on an accelerometer, according to one embodiment of the invention.

FIG. 8 is a flow diagram illustrating an exemplary process for navigating an image based on an accelerometer, according to one embodiment of the invention. Exemplary process 800 may be performed by a processing logic that may comprise hardware (circuitry, dedicated logic, etc.), software (such as is run on a dedicated machine), or a combination of both. In one embodiment, exemplary process 800 includes, but is not limited to, displaying a first portion of a document page on a display of the portable device prior to the movement, and displaying a second portion of the document page different than the first portion on the display of the portable device if the determined direction of the movement relatively matches the predetermined direction.

Referring to FIG. 8, at block 801, a first portion of an image (e.g., a portion of a map as shown in FIG. 7A) is displayed on a display of a portable device. The image may be a part of a panorama image, a virtual reality image database, a three dimensional image database, or an environment formed by multiple camera inputs, etc. At block 802, a movement of the portable device is detected using an accelerometer attached to the portable device. In response to the detection, at block 803, a moving direction is calculated based on the movement data (e.g., X, Y, and Z axis information) provided by the accelerometer. In one embodiment, in response to the detection, the accelerometer signals the associated controller and/or firmware with the movement data. The controller and/or firmware may calculate the moving direction based on the movement data. Alternatively, the calculation of the moving direction may be performed by other components of the portable device, such as, for example, the motion software component 104 of FIG. 1 and/or the operating system of the portable device. At block 804, a second portion of the image is displayed based on the determined moving direction. In one embodiment, multiple intermediate portions of the image may be displayed that forms a transition from the first portion to the second portion. The second portion is displayed as if the portable device is moving while the displayed image remains steady. Other operations may also be performed.

Gaming Applications Based on an Accelerometer

According to another embodiment of the invention, an accelerometer may be used in a gaming application, where the accelerometer may be used to detect a scene change during a video game running within a portable device.

Figure 9A:
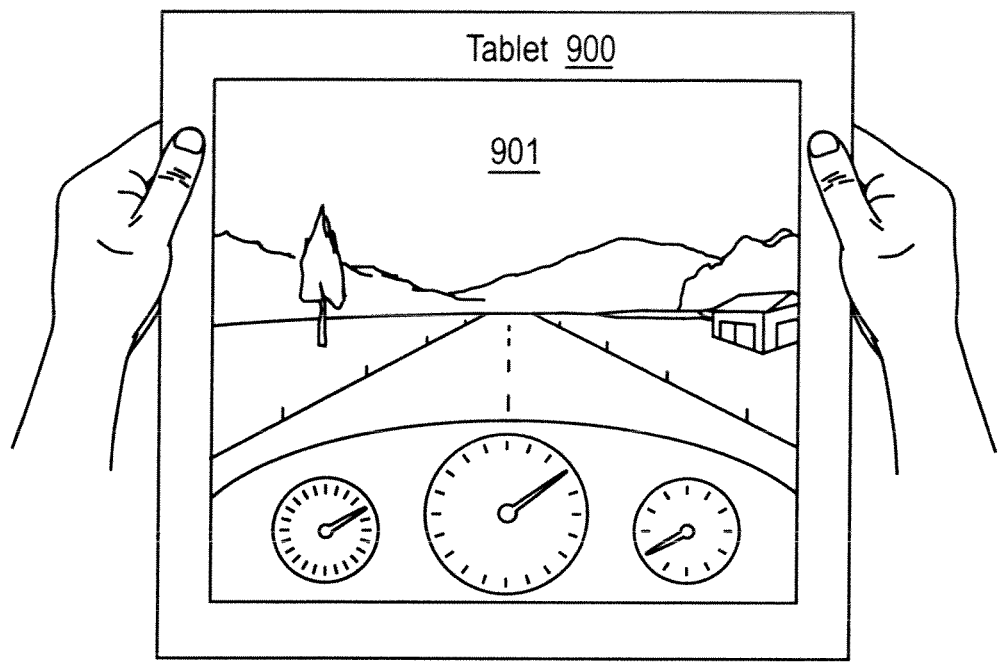
FIGS. 9A and 9B are diagrams illustrating an exemplary gaming application based on an accelerometer, according to one embodiment of the invention.
Figure 9B:
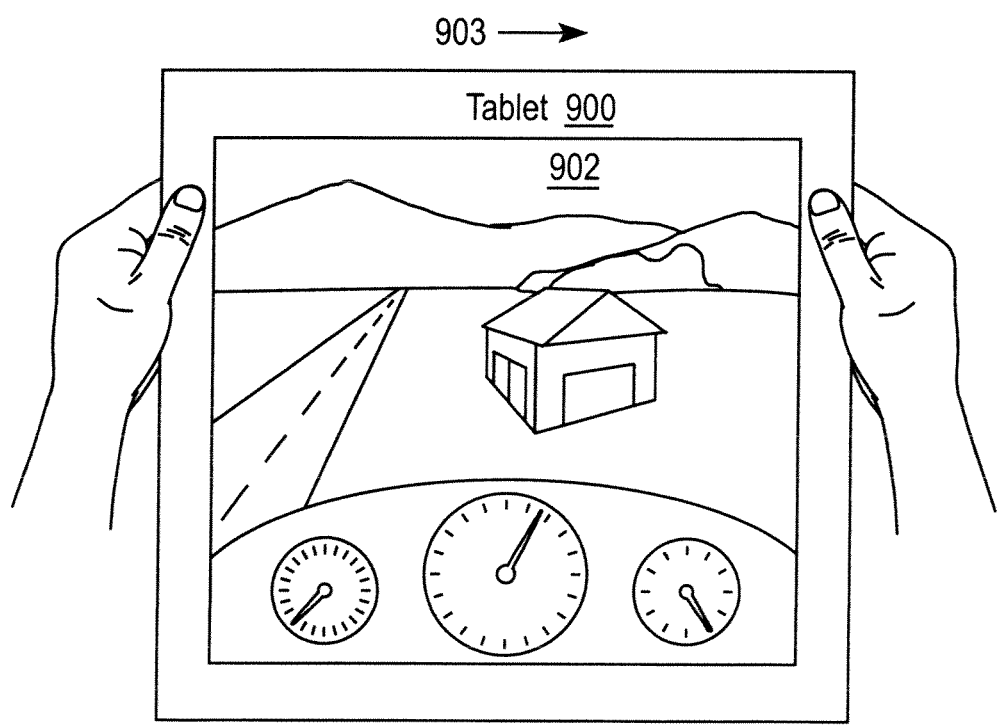

FIGS. 9A and 9B are diagrams illustrating an exemplary gaming application based on an accelerometer, according to one embodiment of the invention. In this embodiment, as an example, a user is holding a portable device 900 as a steering wheel as if the user is driving a vehicle facing a first scene 901. As the user moves (e.g., turning) the portable device towards to a direction, such as, for example, direction 903, the displayed scene may be changed to a second scene 902 as shown in FIG. 9B.

According to one embodiment, when the user holding the portable device 900 move according to the direction 903, the accelerometer attached to the portable device detects such a movement. The accelerometer may provide movement data (e.g., X, Y, and Z axis information) to a controller and/or firmware of the portable device. The associated controller and/or firmware may calculate a moving direction based on the movement data provided by the accelerometer, using one or more predetermined formulas. Thereafter, the controller and/or firmware may communicate the moving direction and/or moving distance or acceleration to the associated gaming application software that is currently providing the game.

In response, the gaming application software may determine the second scene of the game based on the moving direction, moving distance, and/or moving acceleration provided by the controller and/or firmware. The gaming application software then displays the second scene accordingly. As a result, the user does not have to press and/or click a button in order to change a scene of the game. Note that the moving direction 903 is shown for the illustration purposes only. Any other directions may be applied.

In one embodiment, the second scene of the game may be displayed via a transition from the first scene. That is, multiple intermediate scenes between the first and second scenes may be sequentially displayed to form a transition from the first scene to the second scene. As a result, the second scene "comes into" the display of the portable device gradually.

According to a further embodiment, certain movements may be detected as a way to accelerate and/or de-accelerate the driving vehicle. For example, the displayed scene may be changed to show an acceleration of the vehicle when the portable device is tilted up (e.g., similar to stepping on the gas). Similarly, the displayed scene may be changed to show a de-acceleration of the vehicle when the portable device is tilted down (e.g., similar to stepping on the brake).

In addition, an accelerometer may be used to detect whether a movement of the portable device exceeds certain thresholds. If so, one or more predetermined user configurable actions may be performed. For example, during a driving game, when a user drives the vehicle off the road, a warning message may be communicated to the user for such an indication.

Figure 10A:
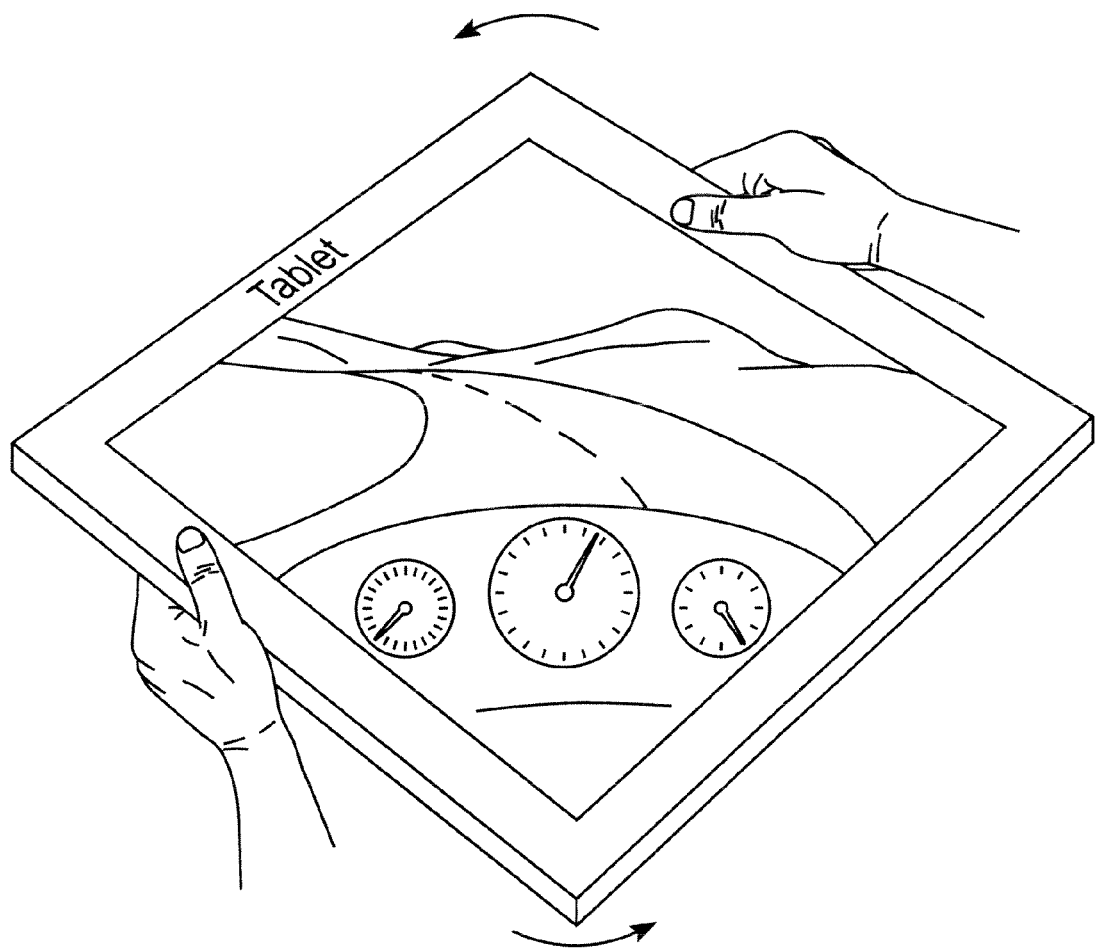
FIGS. 10A and 10B are diagrams illustrating an exemplary gaming application based on an accelerometer, according to another embodiment of the invention.
Figure 10B:
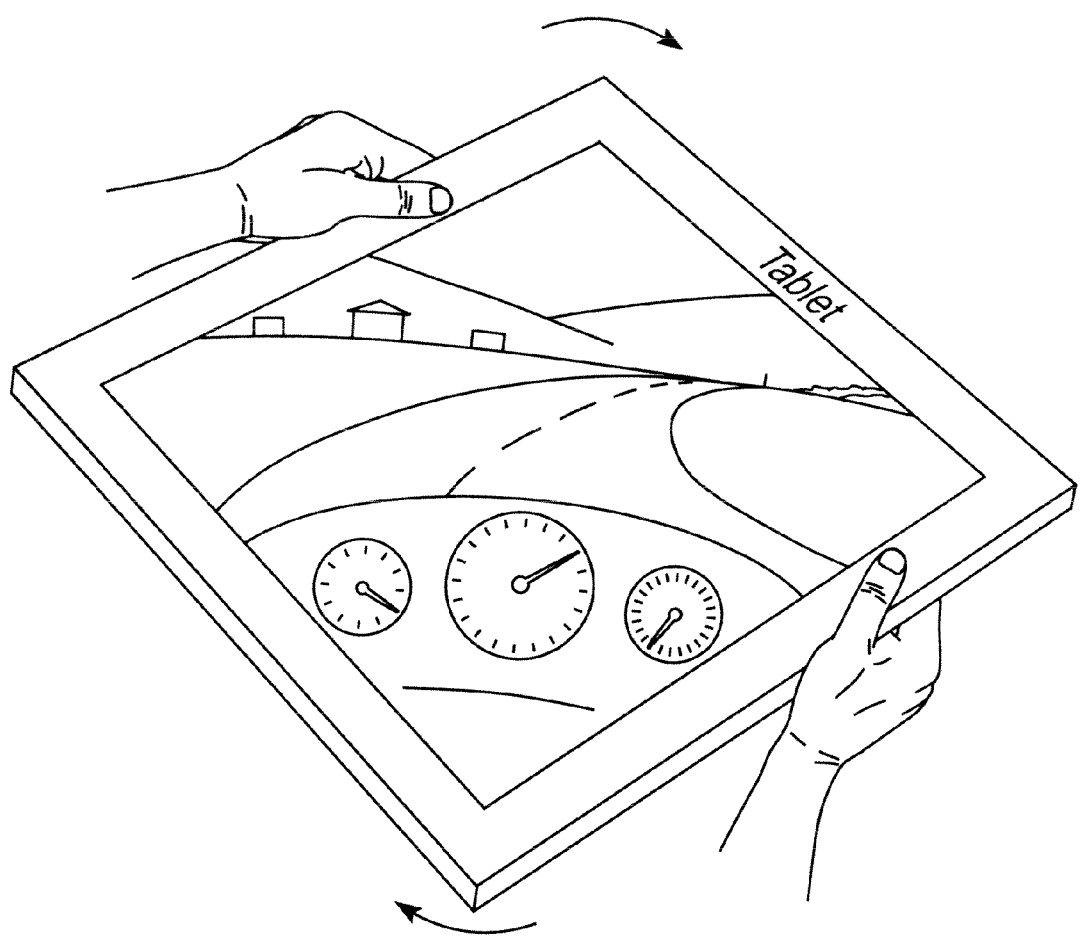

FIGS. 10A and 10B are diagrams illustrating an exemplary gaming application based on an accelerometer, according to another embodiment of the invention. In this embodiment, a user is holding a portable device having an accelerometer built-in therein as a steering wheel of a vehicle. As shown in FIG. 10A, when a scene includes a road curved to left, the user is required to turn the steering wheel to left accordingly in order to stay on the road. An accelerometer attached to the portable device may be used to detect whether the portable device (e.g., the steering wheel) has been turned accordingly and whether the turning angle or distance is appropriate.

If it is detected that the turning of the portable device is not turned or not turned enough, the associated gaming application software may perform certain predetermined actions. For example, the gaming application may generate an alarm to the user, such as, for example, a vibration of the portable device or an audio alert, etc. In addition, an off-road scene may be displayed. If it is detected that the user does not respond to the changing of the road condition for a period of time, a crashed scene may be displayed accordingly.

According to certain embodiments, other moving directions may be used to "look up" and "look down" from a viewpoint of a user holding the portable device. For example, in a flying game, a user could hold a portable device as if the user is driving a flying object (e.g., an airplane), where an accelerometer may be used to detect the movement of the portable device in order to determine where the flying object is heading. For example, the flying object is going up when the portable device is tilted up and the flying object is going down when the portable device is tilted down. Other directions, such as, for example, those or a combination of those shown in FIG. 5A, may be utilized to enable the flying object to fly any directions.

Similarly, in a shooting game according to one embodiment, in addition to those movements described above, which may be used to look up, look down, and/or look around, a vertical movement of the portable device parallel to the display surface of the portable device may be used to detect whether a user is in a standup shooting position or in a hiding position. For example, when the portable device is moved down, a protection barrier may be displayed blocking the opponents to indicate that a user holding the portable device as a shooting weapon is hiding behind the protection barrier. When the portable device is moved up, the protection barrier may be removed exposing the opponents to indicate that the user is in a shooting position without protection. Other gaming configurations may exist.

Figure 11:
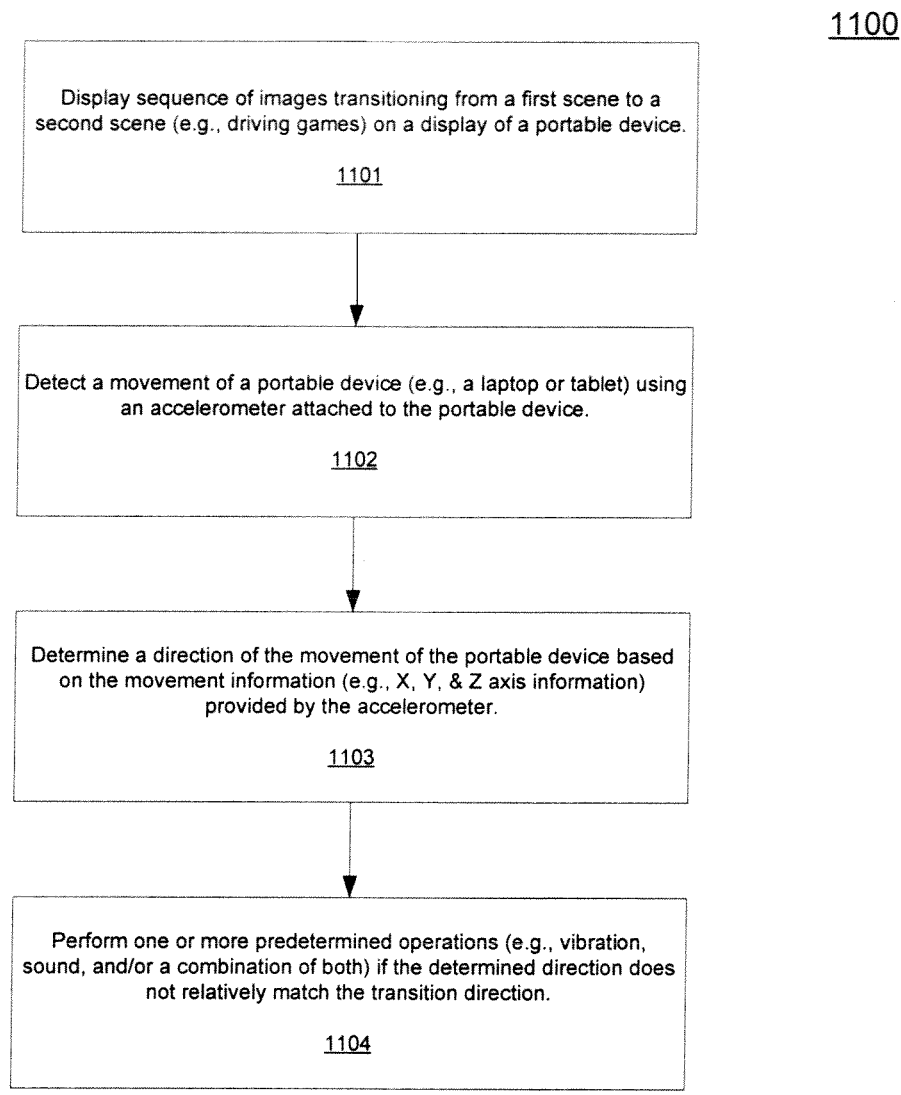
FIG. 11 is a flow diagram illustrating an exemplary process for a gaming application based on an accelerometer, according to one embodiment of the invention.

FIG. 11 is a flow diagram illustrating an exemplary process for a gaming application based on an accelerometer, according to one embodiment of the invention. Exemplary process 1100 may be performed by a processing logic that may comprise hardware (circuitry, dedicated logic, etc.), software (such as is run on a dedicated machine), or a combination of both. In one embodiment, exemplary process 1100 includes, but is not limited to, displaying a sequence of images transitioning towards a direction from a first scene to a second scene from a viewpoint of a user, detecting whether the movement of the portable device is in accordance with a direction associated with the direction of the transition from the viewpoint of the user, and performing a predetermined operation if the movement is not detected in accordance with a direction associated with the direction of the transition.

Referring to FIG. 11, at block 1101, a sequence of images transitioning from a first scene to a second scene (e.g., a driving game) is displayed on a display of a portable device. At block 1102, a movement of the portable device is detected using an accelerometer attached to the portable device. At block 1103, a moving direction of the portable device is determined based on movement data provided by the accelerometer. In one embodiment, the moving direction is determined by a controller and/or firmware coupled to the accelerometer, similar to the configuration shown in FIG. 1. In response to the determined moving direction, at block 1104, one or more predetermined operations, such as, for example, causing vibration of the portable device, generating an audio alert, or a combination of both, may be performed. Other operations may also be performed.

Activating/Deactivating Devices Based on an Accelerometer

According to another embodiment of the invention, an accelerometer may be used to detect a movement of a portable device and an orientation of the portable device may be determined based on the movement data provided by the accelerometer. Thereafter, one or more interfaces of the portable device may be activated or deactivated based on the determined orientation after the movement.

Figure 12A:
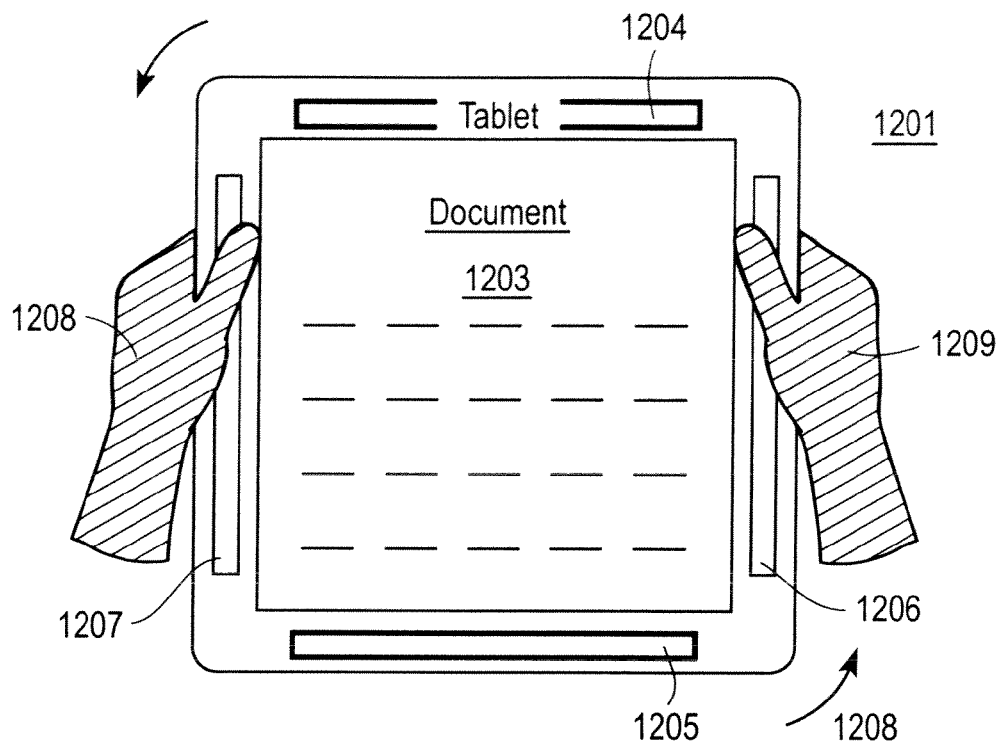
FIGS. 12A and 12B are diagrams illustrating an exemplary mechanism for activating/deactivating interfaces of a portable device based on an accelerometer, according to one embodiment of the invention.
Figure 12B:
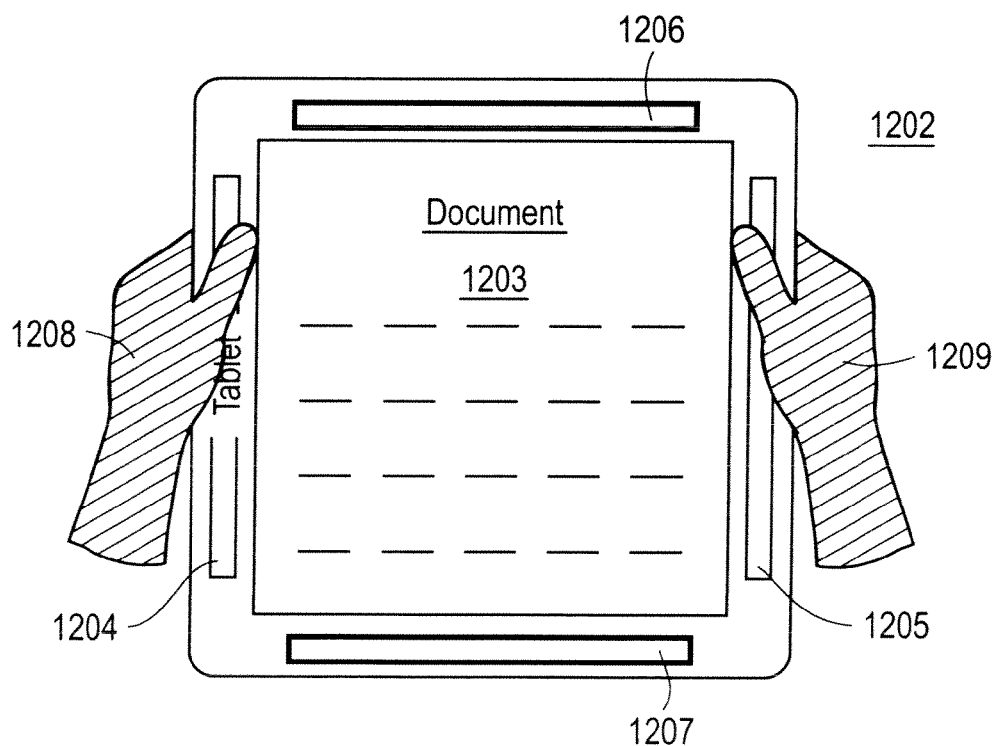

FIGS. 12A and 12B are diagrams illustrating an exemplary mechanism for activating/deactivating interfaces of a portable device based on an accelerometer, according to one embodiment of the invention. In this embodiment, as shown in configuration 1201 of FIG. 12A, multiple interfaces 1204-1207 are disposed on multiple locations of the portable device. As an example, interfaces 1204-1207 are described herein as wireless interfaces, such as, for example, antennas or wireless transceivers. It will be appreciated that other interfaces may also be applied.

Referring to FIG. 12A, initially for a given orientation 1201, document 1203 is displayed. According to one embodiment, when a user holds up the portable device in orientation 1201, an accelerometer attached to the portable device may detect such a movement and orientation 1201 is determined by the associated controller and/or firmware coupled to the accelerometer similar to those shown in FIG. 1. In view of the determined orientation, it may be determined that wireless interfaces 1204 and 1205 are in the best positions to transmit and/or receive wireless signals given the orientation 1201 (e.g., receiving and/or transmitting strongest signals), while the wireless interfaces 1206-1207 are in relatively weak positions. As a result, wireless interfaces 1204-1205 may be activated and wireless interfaces 1206-1207 may be optionally de-activated.

When the portable device is moved, for example, rotated according to the direction 1208 for 90 degrees, the portable device may end up with different orientation 1202 as shown in FIG. 12B. An accelerometer attached to the portable device may detect such a movement and communicate the movement data to other components of the portable device as described above. In addition to maintaining an orientation of a document page being displayed relatively identical to the one prior to the movement as described above with respect to FIGS. 3A and 3B, the wireless interfaces 1204-1207 may be reevaluated whether the existing configuration is still the best configuration for the orientation after the movement.

In this embodiment, it is assumed that the wireless interfaces of the top and bottom positions of the portable device are considered at the best positions. After the movement (e.g., turn left with 90 degrees), the original wireless interfaces 1204-1205 that were in the best positions may not be in the best positions any more. Rather, the wireless interfaces 1206-1207 that were not in the best positions now may be in the best positions. As a result, in response to the detection of the movement and the determination of the orientation after the movement, wireless interfaces 1206 and 1207 may be activated as shown in bold, since they are in the best positions. Similarly, the wireless interfaces 1204-1205 may be deactivated since they are no longer in the best positions.

Furthermore, in addition to detect whether the portable device is moved, it is also determined whether the portable device is picked up or held by a user based on the movement data provided by the accelerometer. In one embodiment, such a determination may be performed by a controller and/or firmware coupled to the accelerometer similar to the configuration shown in FIG. 1. If it is determined that the portable device is held by a user, it may be further determined or predicted the location of the user's hands 1208-1209 holding the portable device.

For example, in the orientation 1201 as shown in FIG. 12A, after predicting the locations of the user's hands, one or more wireless interfaces, such as wireless interfaces 1207 and 1208, that may be covered by the hands 1208-1209 may be deactivated. Similarly, in the orientation 1202 after the movement as shown in FIG. 12B, wireless interfaces 1204 and 1205 may be deactivated since it is predicted that they are covered by the user's hands.

Figure 13:
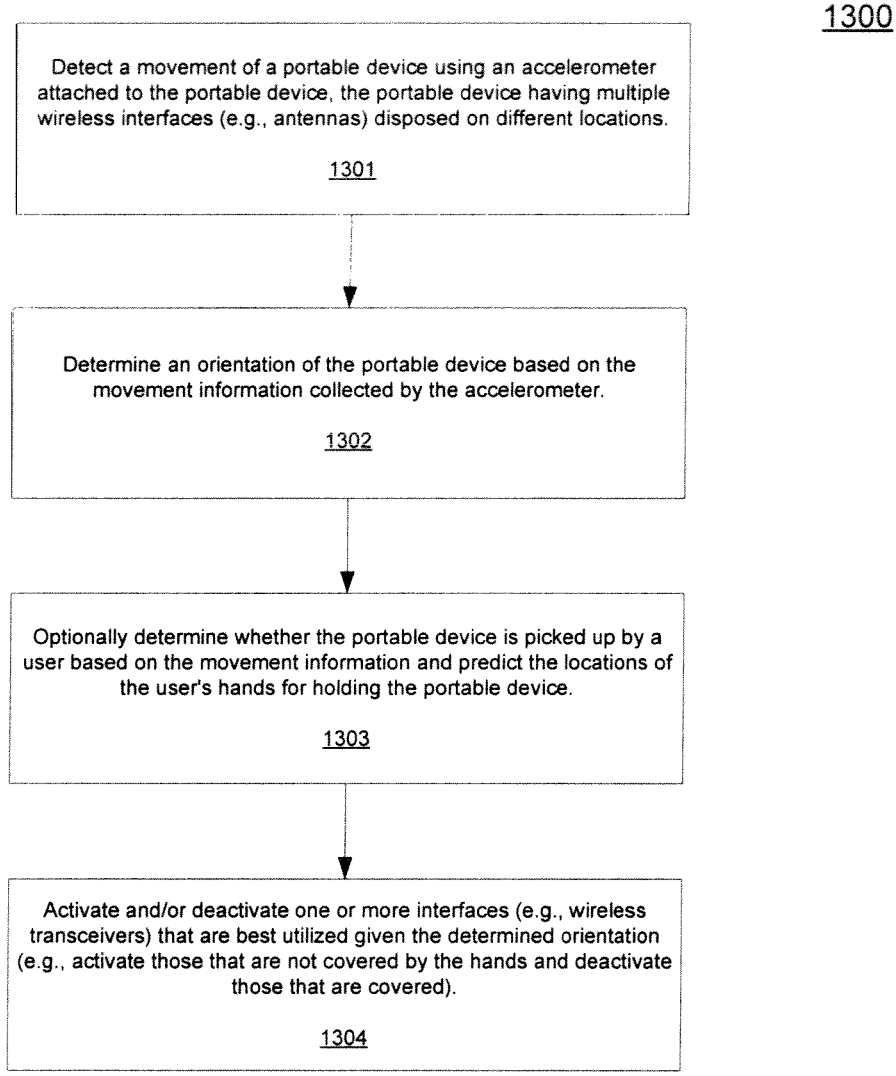
FIG. 13 is a flow diagram illustrating an exemplary process for operating interfaces of a portable device based on an accelerometer, according to one embodiment of the invention.

FIG. 13 is a flow diagram illustrating an exemplary process for operating interfaces of a portable device based on an accelerometer, according to one embodiment of the invention. Exemplary process 1300 may be performed by a processing logic that may comprise hardware (circuitry, dedicated logic, etc.), software (such as is run on a dedicated machine), or a combination of both. In one embodiment, exemplary process 1300 includes, but is not limited to, detecting a movement of a portable device using an accelerometer attached to the portable device, determining an orientation of the portable device after the movement based on movement data provided by the accelerometer, and activating at least one interface of the portable device that is best suitable for given the determined orientation.

Referring to FIG. 13, at block 1301, a movement of a portable device is detected using an accelerometer attached to the portable device, where the portable device includes multiple interfaces (e.g., wireless interfaces) disposed on multiple locations. At block 1302, an orientation of the portable device after the movement is determined based on movement data provided by the accelerometer. At block 1303, optionally, it is determined whether the portable device is picked up or held by a user based on the movement data provided by the accelerometer. If so, it is predicted the location of the user's hands holding the portable device. At block 1304, one or more interfaces may be activated or deactivated based on the determined orientation. Optionally, some of the interfaces that are covered by the predicted user's hands may be deactivated while activating those that are not covered. Other operations may also be performed.

Figure 14A:
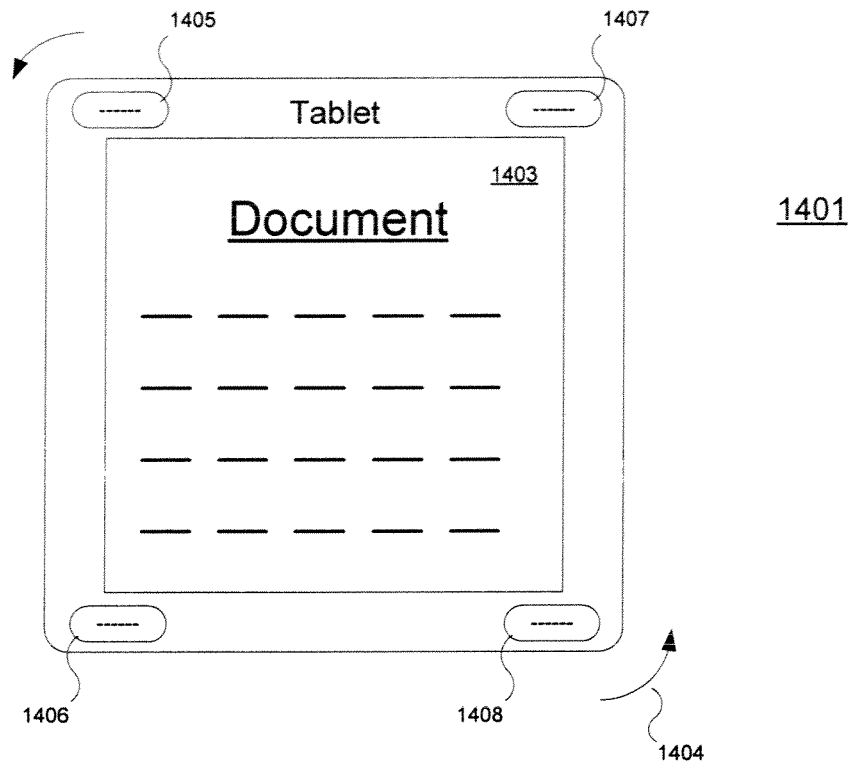
FIGS. 14A and 14B are diagrams illustrating an exemplary mechanism for activating/deactivating multimedia interfaces of a portable device using an accelerometer, according to one embodiment of the invention.
Figure 14B:
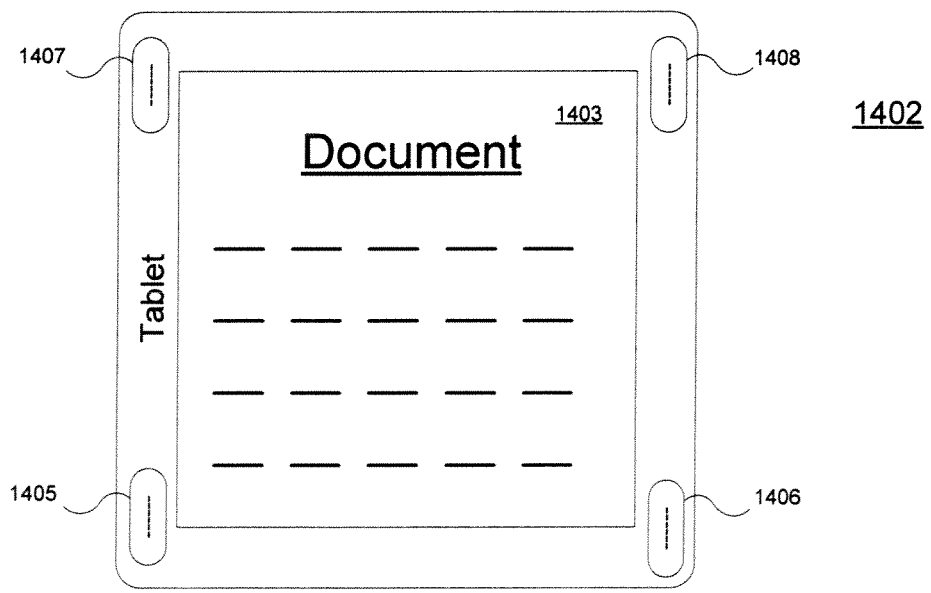

According to one embodiment, the above described techniques may also be applied to multimedia interfaces of the portable device. FIGS. 14A and 14B are diagrams illustrating an exemplary mechanism for activating/deactivating multimedia interfaces of a portable device using an accelerometer, according to one embodiment of the invention. In this embodiment, as an example, one or more speakers are used as multimedia interfaces of the portable devices. Referring to FIG. 14A, a portable device includes multiple speakers 1405-1408 disposed on different locations of the portable device and a document page 1403 is optionally displayed on a display of the portable device. In the orientation 1401 prior to a movement, an audio driver may be configured to generate proper 3D surround sound considering speakers 1405-1406 on the left and speakers 1407-1408 on the right. When the portable device is moved, for example, according to the moving direction 1404 for 90 degrees, a second orientation 1402 is detected and determined by an accelerometer and its associated controller and/or firmware as shown in FIG. 14B.

In response to the detection, in addition to maintaining an orientation of a document page 1403 being displayed relatively identical to the one prior to the movement as described above with respect to FIGS. 3A and 3B, the positions of the speakers 1405-1408 may be reevaluated whether the existing configuration is still the best configuration for the orientation after the movement. In this example, originally left speakers 1405 and 1406 are at the bottom while originally right speakers 1407 and 1408 are on the top as shown in FIG. 14B. Thus, the existing audio conditions have changed and the sound effects are not longer in the best state. As a result, the audio driver may be reconfigured to produce an audio quality relatively equivalent to the one prior to the movement of the portable device. For example, speakers 1405 and 1407 may be used as speakers on the left while speakers 1406 and 1408 may be used as speakers on the right, in order to produce proper sound effects. Other configurations may also exist.

Figure 15:
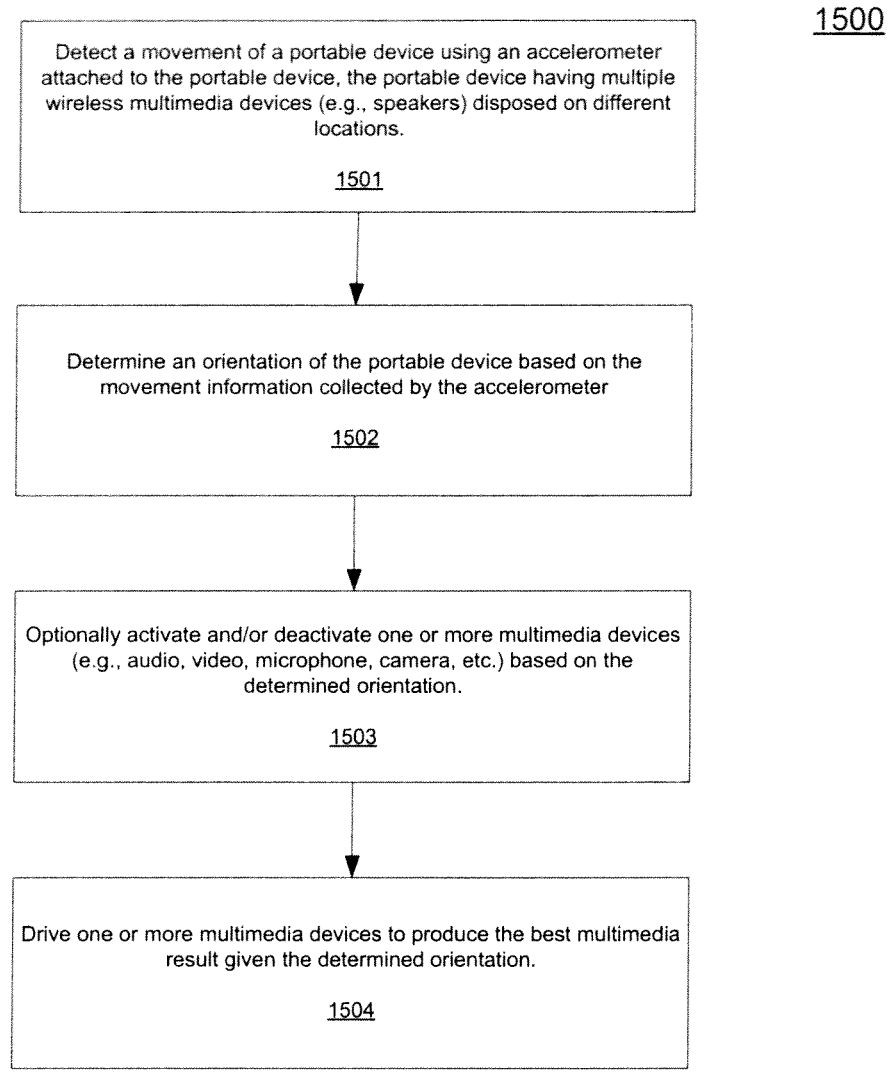
FIG. 15 is a flow diagram illustrating an exemplary process for reconfiguring multimedia interfaces based on an accelerometer, according to one embodiment of the invention.

FIG. 15 is a flow diagram illustrating an exemplary process for reconfiguring multimedia interfaces based on an accelerometer, according to one embodiment of the invention. Exemplary process 1500 may be performed by a processing logic that may comprise hardware (circuitry, dedicated logic, etc.), software (such as is run on a dedicated machine), or a combination of both. Referring to FIG. 15, at block 1501, a movement of a portable device is detected using an accelerometer attached to the portable device, where the portable device includes multiple multimedia interfaces or devices disposed on different locations. At block 1502, an orientation of the portable device after the movement is determined based on the movement data provided by the accelerometer. At block 1503, one or more multimedia interfaces may be optionally activated or deactivated based on the determined orientation. At block 1504, one or more multimedia devices are driven to produce best results given the determined orientation after the movement. Other operations may also be performed.

Although wireless interfaces and audio interfaces are used as an example herein, it is not so limited. Other types of interfaces, such as, for example, a video interface, a microphone, and a camera, may also be applied.

According to certain embodiments of the invention, some devices may only be properly used when the machine is in a certain orientation or a different orientation than it is normally used. Media insertion, for example, may require the device to be placed on its side or upside down to provide access. Ejecting media may require the device to be placed on its side or upside down to prevent the media from being blocked or falling to the floor.

For example, according to one embodiment, a user may initiate an ejection of a media from a media device or component (e.g., a CD from a CD ROM device) by pressing a button or other controls. The device prepares to eject the media or to unmount a disk, etc. Meanwhile, a control module or application software controlling the device may detect that the portable device is not in a position suitable for ejecting the media using an accelerometer attached to the device. As a result, the device may wait for the unit to be positioned in a proper position or orientation by periodically or constantly reading acceleration data from the accelerometer. The application software associated with the device may further notify a user of the device (e.g., pop up a message or an audio alarm, etc.) that the device needs to be in certain positions in order to complete the user's request. Once the device is in a proper orientation, the requested operations may be performed (e.g., ejecting the media).

Similarly, according to another embodiment, an accelerometer can be used to abort an operation if the user doesn't reorient the unit. If the device is not repositioned into a proper or predetermined position within a time period, the device can cancel the requested operations or provide the user with further instructions. According to a further embodiment, an accelerometer may be used to detect the orientation or in order to enable and/or disable input devices mounted on the sides or bottom of the device. For example, there could be an eject button on the bottom of the device that is disabled when the device is upright. This way, the button is not activated by the user placing the device on a desk or in their lap.

Figure 24:
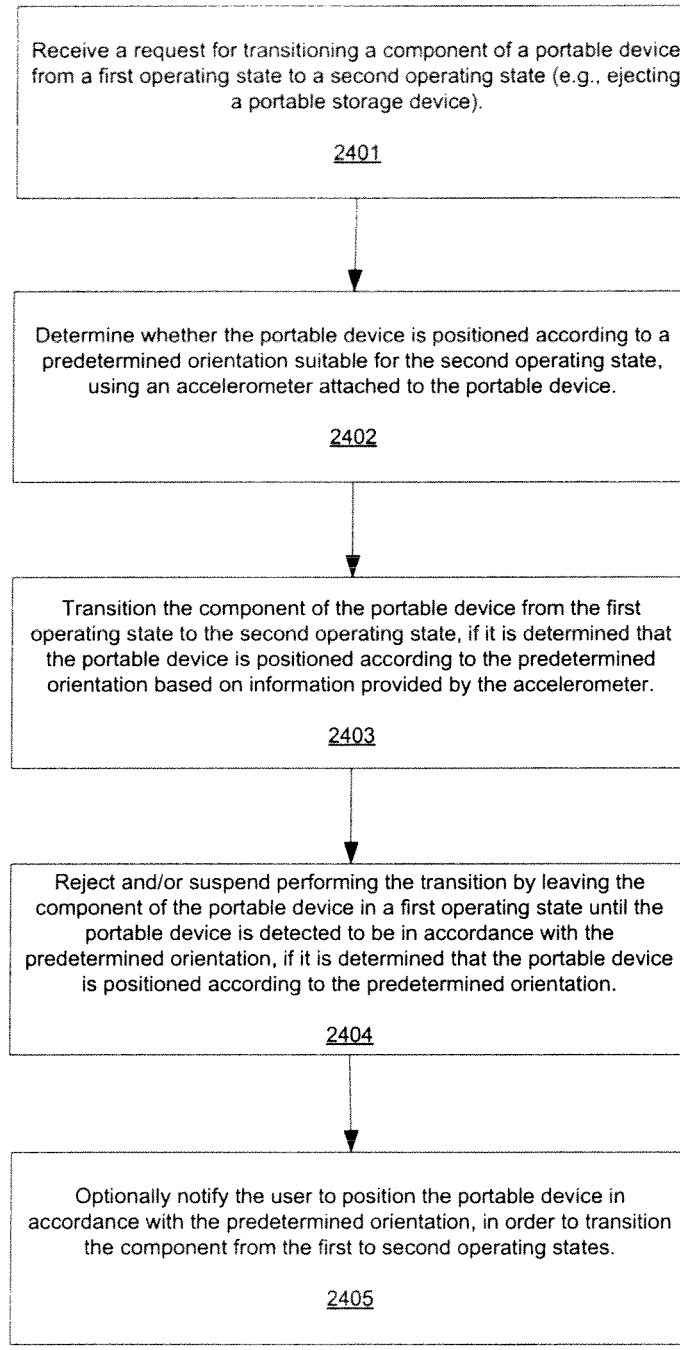
FIG. 24 is flow diagram illustrating an exemplary process for operating a component of a portable device using an accelerometer, according to one embodiment of the invention.

FIG. 24 is a flow diagram illustrating an exemplary process for activating or deactivating a device according to another embodiment of the invention. Exemplary process may be performed by a processing logic that may comprise hardware (circuitry, dedicated logic, etc.), software (such as is run on a dedicated machine), or a combination of both.

Referring to FIG. 24, at block 2401, a request for transitioning a component of a portable device from a first operating state into a second operating state is received (e.g., ejecting a portable storage device). At block 2402, it is determined whether the portable device is positioned according to a predetermined orientation suitable for the second operating state, using an accelerometer attached to the portable device.

At block 2403, if it is determined that the portable device is positioned according to the predetermined orientation or position based on the acceleration information provided by the accelerometer, the component of the portable device is then transitioned from the first operating state into the second operating state (e.g., opening a tray of a CD ROM). However, if the portable device is not in the predetermined position or orientation, at block 2404, the requested transition is rejected or suspended, leaving the component of the portable device remained in the first operating state or other states (e.g., a tri-state, etc.) Meanwhile, the position or orientation of the portable device is periodically or constantly monitored using the accelerometer, where the requested operations may be resumed once the position or orientation of the portable device is detected to be in a proper position or orientation. The requested operations may be aborted if the portable device is not in a proper position or orientation for a predetermined period of time. Optionally, at block 2405, a notification may be generated to notify the user of the portable device to put the portable device in certain positions in order to complete the requested operations. Other operations may also be performed.

Other Applications Based on an Accelerometer

According to another embodiment of the invention, an accelerometer may be used to detect and determine activities of a user with a portable device having the accelerometer attached therein. According to one embodiment, for example, an accelerometer attached to a portable device, which may be held by a user, may detect that the user is joggling while holding the portable device. In this example, the portable device may be digital multimedia player (e.g., an MP3 player). The accelerometer attached to the portable device may detect that the movements of the portable device caused by the user's activities may be repetitive.

In response to the detection, a repetitive rate of the movements of the portable device may be determined, for example, by a controller and/or firmware coupled to the accelerometer, similar to the configuration shown in FIG. 1. Once the repetitive rate of the movement is determined, an application software (e.g., a Windows media player from Microsoft or a real player from Real Networks) may adjust a rhythm of multimedia contents currently being played by the portable device may be adjusted to relatively match the determined repetitive rate of the movements. As a result, for example, the tempo of a music currently played by an MP3 player may be adjusted to relatively match the joggling rate of the user holding the MP3 player.

Furthermore, according to a further embodiment, an application software may further select and play a multimedia content that is best suitable for the determined user's activities (e.g., joggling rate). In one embodiment, a user may configure a multimedia player via a user interface that under certain circumstances, certain types of multimedia contents may be selected and played. As a result, when the accelerometer and its associated controller and/or firmware detects that a user is performing certain types of activities, an associated type of multimedia contents may be selected and played accordingly.

Figure 16:
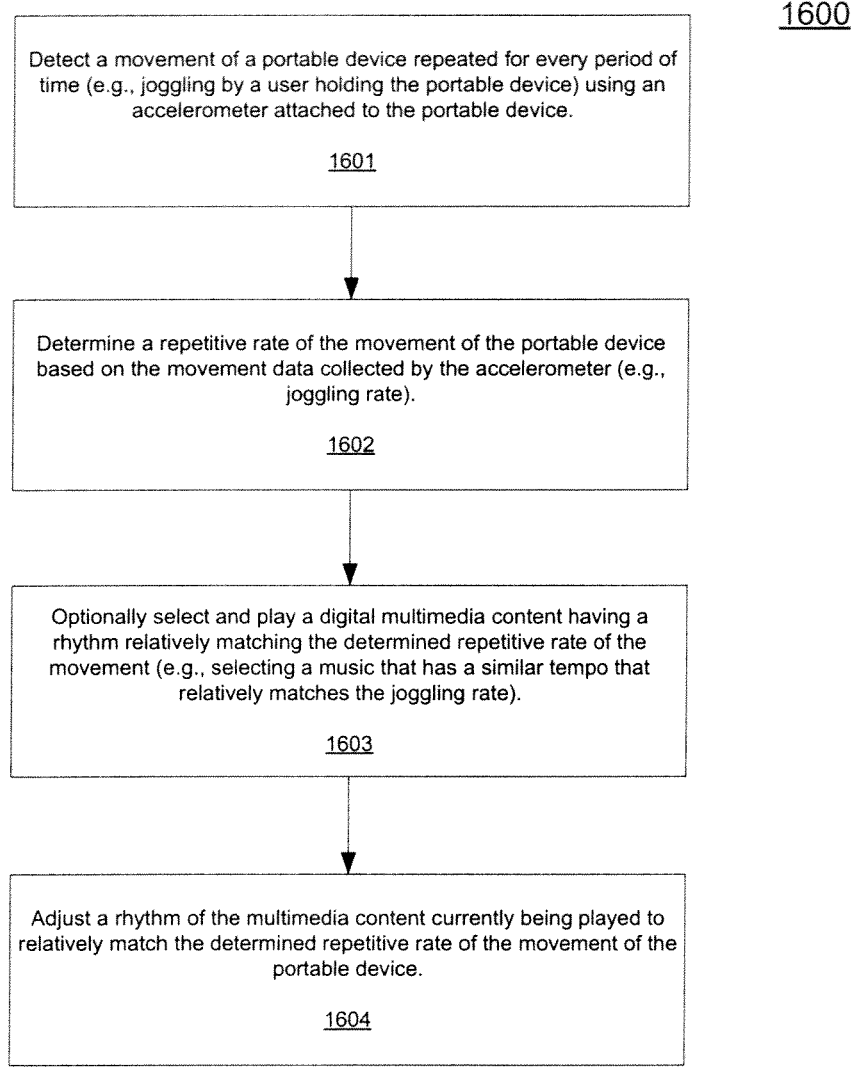
FIG. 16 is a flow diagram illustrating an exemplary process for playing multimedia contents based on an accelerometer, according to one embodiment of the invention.

FIG. 16 is a flow diagram illustrating an exemplary process for playing multimedia contents based on an accelerometer, according to one embodiment of the invention. Exemplary process 1600 may be performed by a processing logic that may comprise hardware (circuitry, dedicated logic, etc.), software (such as is run on a dedicated machine), or a combination of both. Referring to FIG. 16, at block 1601, a movement of a portable device is detected using an accelerometer attached to the portable device, where the movement of the portable device is repeated for every certain period of time. At block 1602, the repetitive rate of the movements of the portable device is determined based on the movement data provided by the accelerometer. At block 1603, a digital multimedia content having a rhythm relatively matched with the determined repetitive rate is optionally selected and played. At block 1604, a rhythm of the multimedia content currently played is adjusted to relatively match the determined repetitive rate of the movements. Other operations may also be performed.

According to another embodiment of the invention, an accelerometer may be used to determine whether a portable device is moving (e.g., carried by a user) and the portable device should be put in a proper operating state. According to one embodiment, when a portable device is in an inactive state and the portable device is moving, which is detected via an accelerometer attached to the portable device, the portable device may be put in a relatively low power mode, such as, for example, a sleep mode. For example, a laptop computer having its lid closed may be considered being in an inactive state. Since the lid of the laptop computer is closed, the user may not actively operate the laptop computer. Alternatively, a laptop computer is considered in the inactive state when its desktop is locked. Other situations may also be considered as inactive states, which may be user configurable. As a result, the laptop computer may be put into a low power mode. In addition, if the laptop is determined as moving (via the accelerometer), it may be unsafe to write any data to a permanent storage device (e.g., a hard drive). Thus, a read/write head of the permanent storage device may be parked to a safe place without writing the data to the permanent storage device.

According to one embodiment, if the portable device is determined being in an inactive state and the portable device is not moving based on the data provided by an accelerometer attached to the portable device, the portable device may be put into a hibernated mode, where the content of the system memory may be swapped into a permanent storage device (e.g., a hard drive). Since the portable device is not moving, it is relatively safe to write data to the permanent storage device.

Figure 17:
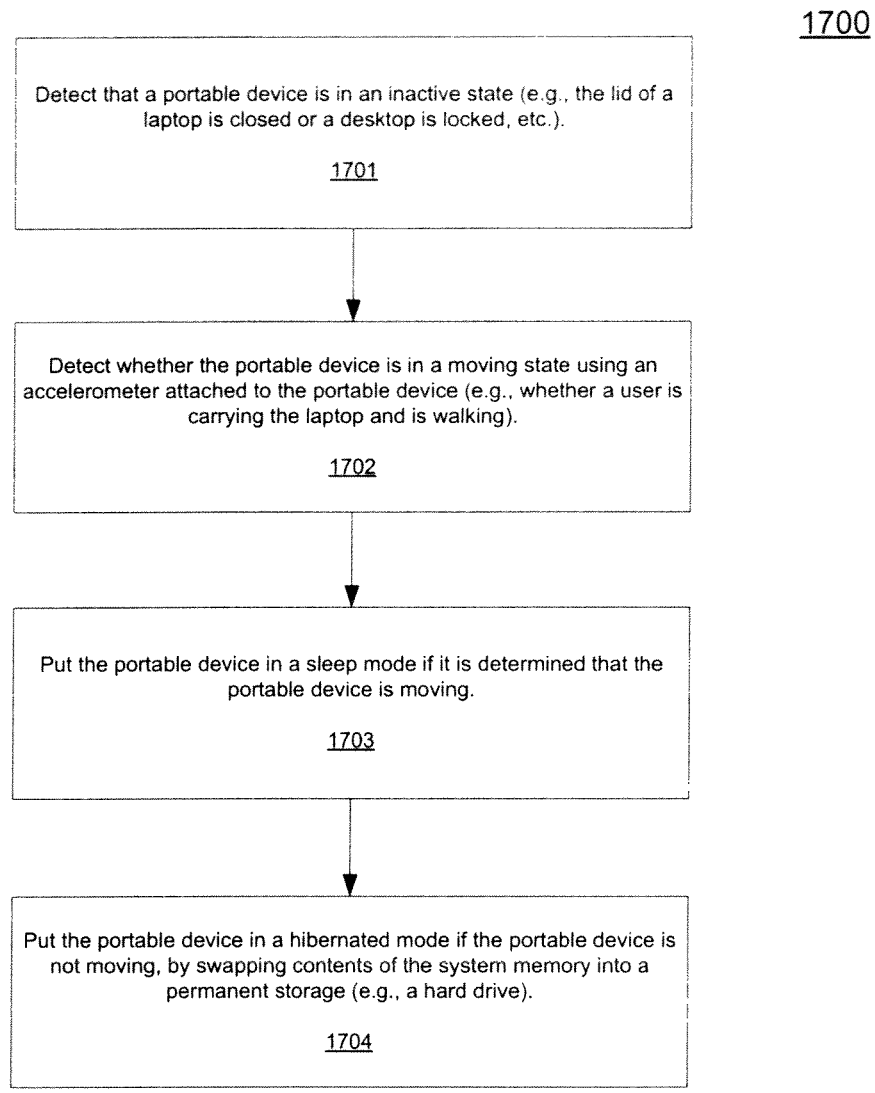
FIG. 17 is a flow diagram illustrating an exemplary process for power management of a portable device according to one embodiment of the invention.

FIG. 17 is a flow diagram illustrating an exemplary process for power management of a portable device according to one embodiment of the invention. Exemplary process 1700 may be performed by a processing logic that may comprise hardware (circuitry, dedicated logic, etc.), software (such as is run on a dedicated machine), or a combination of both. Referring to FIG. 17, at block 1701, a portable device is determined whether the portable device is in an inactive state. For example, when the lid of the portable device is closed or its desktop is locked, the portable device is considered being in an inactive state. At block 1702, the portable device is detected whether the portable device is moving (e.g., whether the portable device is carried by a user) using an accelerometer attached to the portable device. At block 1703, the portable device is put into a relatively low power mode without swapping the content of the system memory into a permanent storage device, if the portable device is moving. Otherwise, at block 1704, the portable device is put into a hibernated mode by swapping the content of the system memory into the permanent storage device, if the portable device is moving. Other operations may also be performed.

According to another embodiment of the invention, an accelerometer may be used to detect whether a portable device is moved according to certain directions, in order to determine whether a password is entered correctly. In one embodiment, when a user of a portable device is prompted to enter a password, the user has to move the portable device to one or more directions as a part of entering the password. An accelerometer attached to the portable device may detect such movement(s) and a moving direction may be determined, for example, by the associated controller and/or the firmware. If the moving direction relatively matches a predetermined direction, it is considered that the password has been "entered" correctly.

According to an alternatively embodiment, a user may be required to enter a first portion of the password on a portable device. Then the user is required to move the portable device according to certain directions. Thereafter, the user is required to enter a second portion of the password (e.g., the rest of the password). Thus, a combination of the password entered and certain movements of portable device constitutes a complete password. Other configurations may exist.

Figure 18:
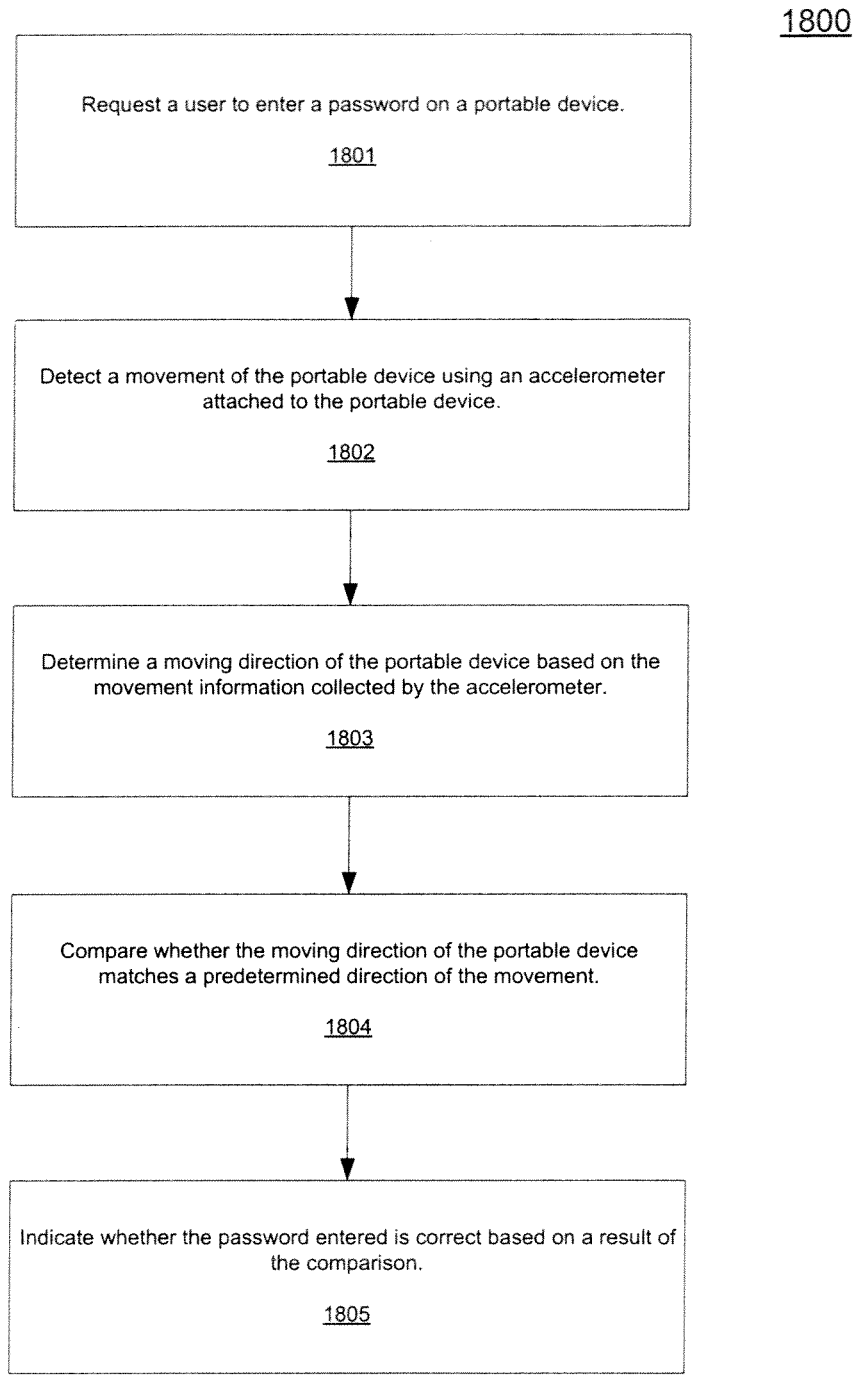
FIG. 18 is a flow diagram illustrating an exemplary process for processing password according to one embodiment of the invention.

FIG. 18 is a flow diagram illustrating an exemplary process for processing password according to one embodiment of the invention. Exemplary process 1800 may be performed by a processing logic that may comprise hardware (circuitry, dedicated logic, etc.), software (such as is run on a dedicated machine), or a combination of both. Referring to FIG. 18, at block 1801, a user is requested to enter a password on a portable device. At block 1802, it is detected whether the portable device is moved using an accelerometer attached to the portable device. At block 1803, a moving direction is determined based on the movement data provided by the accelerometer. At block 1804, it is determined whether the portable device has been moved according to a predetermined direction. At block 1805, an indication is issued indicating whether the password is "entered" correctly based on whether the moving direction relatively matches the predetermined direction. Other operations may also be performed.

According to another embodiment of the invention, an accelerometer may be used to detect and record a sequence of movements of a portable device, where the recorded movement data may be used to recreate the moving history subsequently (e.g., off line). In one embodiment, when a portable device is moved for a period of time, an accelerometer attached to the portable device detects and records such movements. The movement data recorded by the accelerometer may be stored in a storage device (e.g., a hard drive) of the portable device during the movements. Alternatively, the movement data may be transmitted to a remote facility over a network (e.g., a wireless network) during the movements. Subsequently, after the movements, a trail representing the movements over the period of time may be recreated using the movement data provided by the accelerometer.

This is typically useful when a user wishes to replot a trail of a roller coaster ride afterwards. For example, a user may carry the portable device having an accelerometer attached therein and go onto a roller coaster ride. During the ride, the accelerometer may detect and store the movement data into a storage device, or alternatively, transmit the movement data to a remote facility over a network. After the ride, the movement data may be used to recreate a plot of the roller coaster ride. The roller coaster ride is used as an example only, the techniques described above may be applied to other situations. For example, a user who carrying an accelerometer, either attached to a portable device or attached to a vehicle, may drive a vehicle to different locations to perform a survey, in order to create a map for those locations. The map may be subsequently created using the movement data collected by the accelerometer during the drive.

Figure 19:
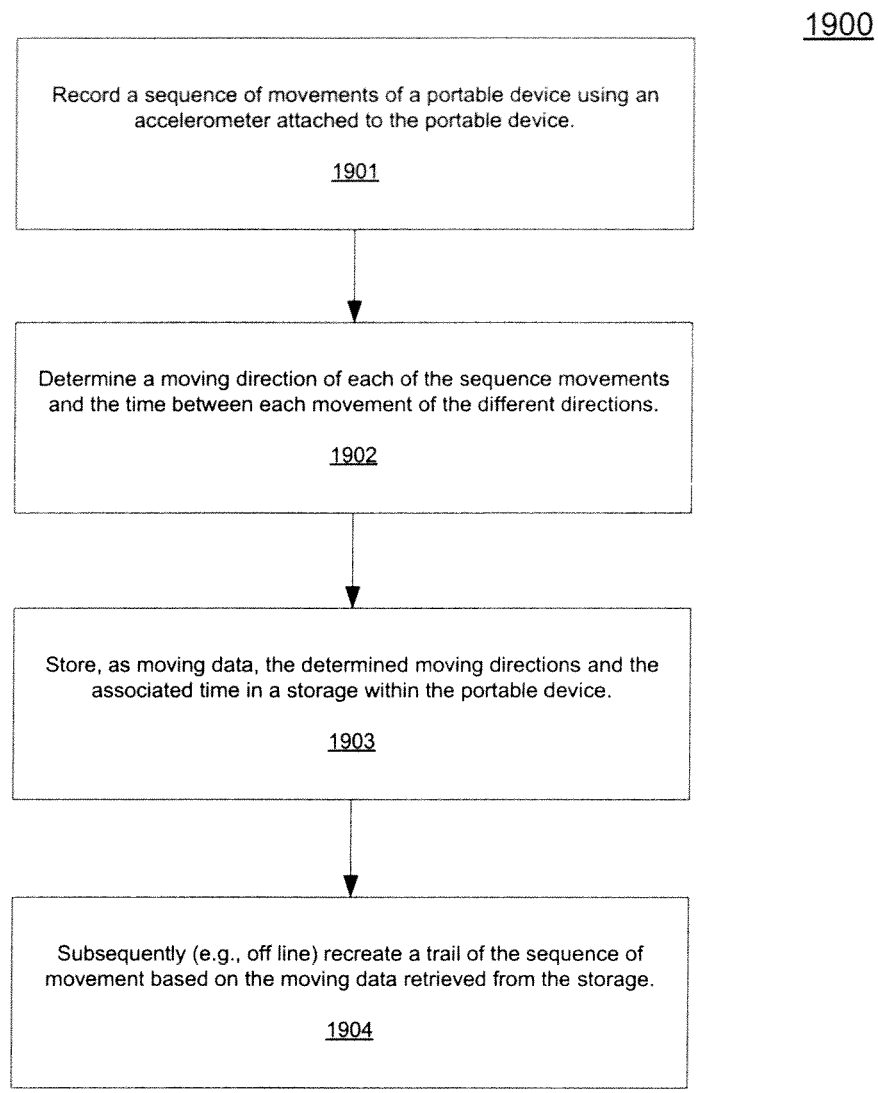
FIG. 19 is flow diagram illustrating an exemplary process for recreating a trail of movements using an accelerometer, according to one embodiment of the invention.

FIG. 19 is flow diagram illustrating an exemplary process for recreating a trail of movements using an accelerometer, according to one embodiment of the invention. Exemplary process 1900 may be performed by a processing logic that may comprise hardware (circuitry, dedicated logic, etc.), software (such as is run on a dedicated machine), or a combination of both. Referring to FIG. 19, at block 1901, a sequence of movements of a portable device is detected using an accelerometer attached to the portable device. In the above example, a vehicle may be considered as a portable device herein. At block 1902, a moving direction of each of the sequential movements and the time between each movement are determined. At block 1903, the information may be stored in a storage device of the portable device. Alternatively, the information may be dynamically transmitted to a remote facility over a network (e.g., a wireless network). Subsequently, at block 1904, a trail representing the movement history may be recreated using the stored movement data. Other operations may also be performed.

Motion Compensation Using an Accelerometer

According to another embodiment of the invention, an accelerometer may be used to detect a movement of a portable device and motion compensation may be applied in response to the detection. For example, an accelerometer attached to a portable device may detect that a user using the portable device (e.g., reading an electronic document displayed on a display of the portable device) may be riding on a bouncing vehicle. In response to the detection, motion compensation may be performed for the displayed document such that the electronic document may remain relatively the same position with respect to eyes of the user.

In one embodiment, position of the display platform as a function of time in the plane of the display may be calculated by appropriately integrating the signals received from the accelerometer. The image is then translated vertically and horizontally on the display as a function of time to keep the image position substantially fixed in space independent of the motion of the display in the plane of the display. Such movements (e.g., sudden movement such as bounce) may be represented via relatively high frequency component of the moving data provided by the accelerometer. Low frequency components of the display motion, such as those caused by the forward velocity of the vehicle may not be compensated in order to prevent the image from drifting off the screen when the vehicle goes up and down hills or around curves. Similarly, such techniques may also be applied to electronic games played by a portable device while riding on a bouncing platform.

Figure 22:
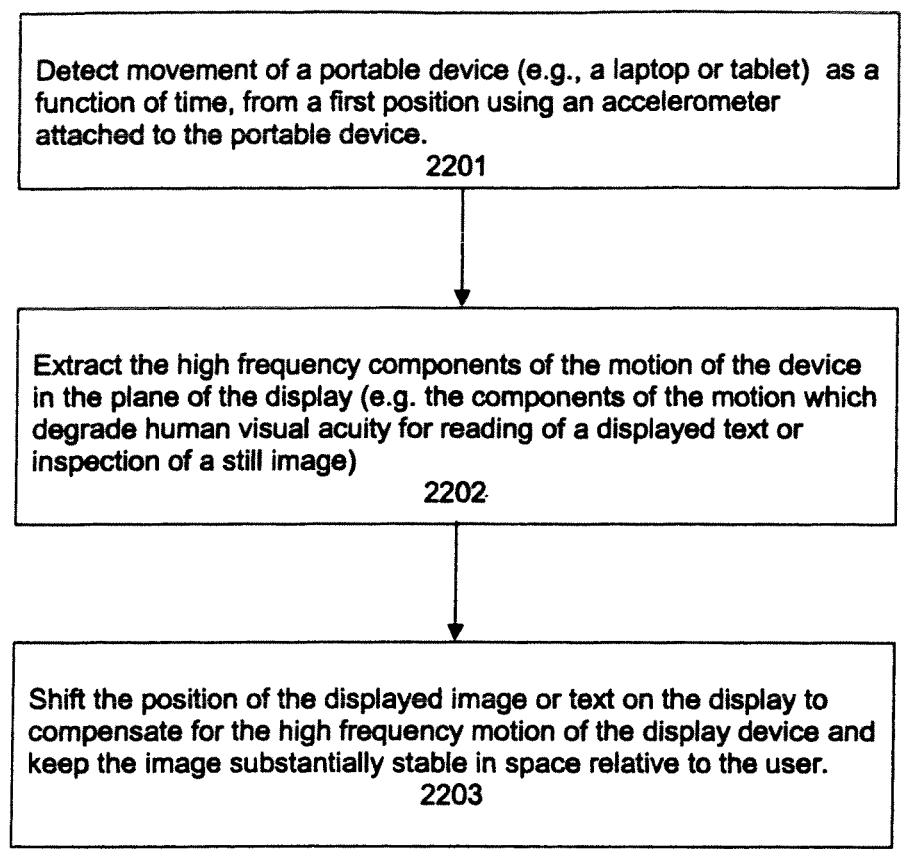
FIG. 22 is a flow diagram illustrating an exemplary process for motion compensation using an accelerometer according to one embodiment of the invention.

FIG. 22 is a flow diagram illustrating an exemplary process for motion compensation using an accelerometer, according to one embodiment of the invention. Exemplary process may be performed by a processing logic that may comprise hardware (circuitry, dedicated logic, etc.), software (such as is run on a dedicated machine), or a combination of both. In one embodiment, the exemplary process includes, but is not limited to, detecting a movement of a portable device using an accelerometer attached to the portable device, determining a moving direction of the portable device based on movement data provided by the accelerometer, and adjusting a position of a displayed object on a display of the portable device to compensate the movement of the portable device, such that the adjusted displayed object remain relatively identical position with respect to a user of the portable device.

Referring to FIG. 22, at block 2201, a movement of a portable device is detected using an accelerometer attached to the portable device. In one embodiment, the movement is detected as a function of time from a location as a part of moving data provided by the accelerometer. The moving data may include relatively high frequency components representing sudden movements and relatively low frequency component representing slow movements. At block 2202, the relatively high frequency components of the moving data are extracted in a plane of the display (e.g., the components of the motion which degrade human visual acuity for reading of a displayed document or inspecting a still image, etc.) At block 2203, the position of the displayed document or image may be shifted based on the extracted high frequency components to compensate for the high frequency motion (e.g., sudden moves) of the portable device. As a result, the displayed document or image may be maintained relatively stable in space with respect to the user. Other operations may also be performed.

Impulse Detection and Applications Using an Accelerometer

According to another embodiment of the invention, an accelerometer may be used to detect impulses given by a user of a portable device. In one embodiment, the techniques allow the user to give impulses, in a physical sense of giving a controlled momentum transfer, as inputs to a portable or fixed device for use by an application program. For example, these impulses can appear to initiate or deflect motion of objects on the display in proportion to the magnitude and direction of the impulse. This will enable games (e.g., billiards and other ball games) and educational/engineering explorations (e.g., response of a structure to a tap).

For example, a user may "toss" a cursor across a display of a portable device by tapping on the side of the portable device. The accelerometer attached to the portable device may detect such a force that causes a movement of the portable device. A direction and magnitude of the force may be determined based on the movement data provided by the accelerometer. When this function is enabled for an application, a tap on the side of the device will cause the cursor to move in a fashion analogous to tapping a small object and causing it to slide some distance across a surface. Similarly, such a technique may be utilized in a variety other applications, such as, for example, video games (e.g., golf, bowling, tennis, etc.)

Figure 23:
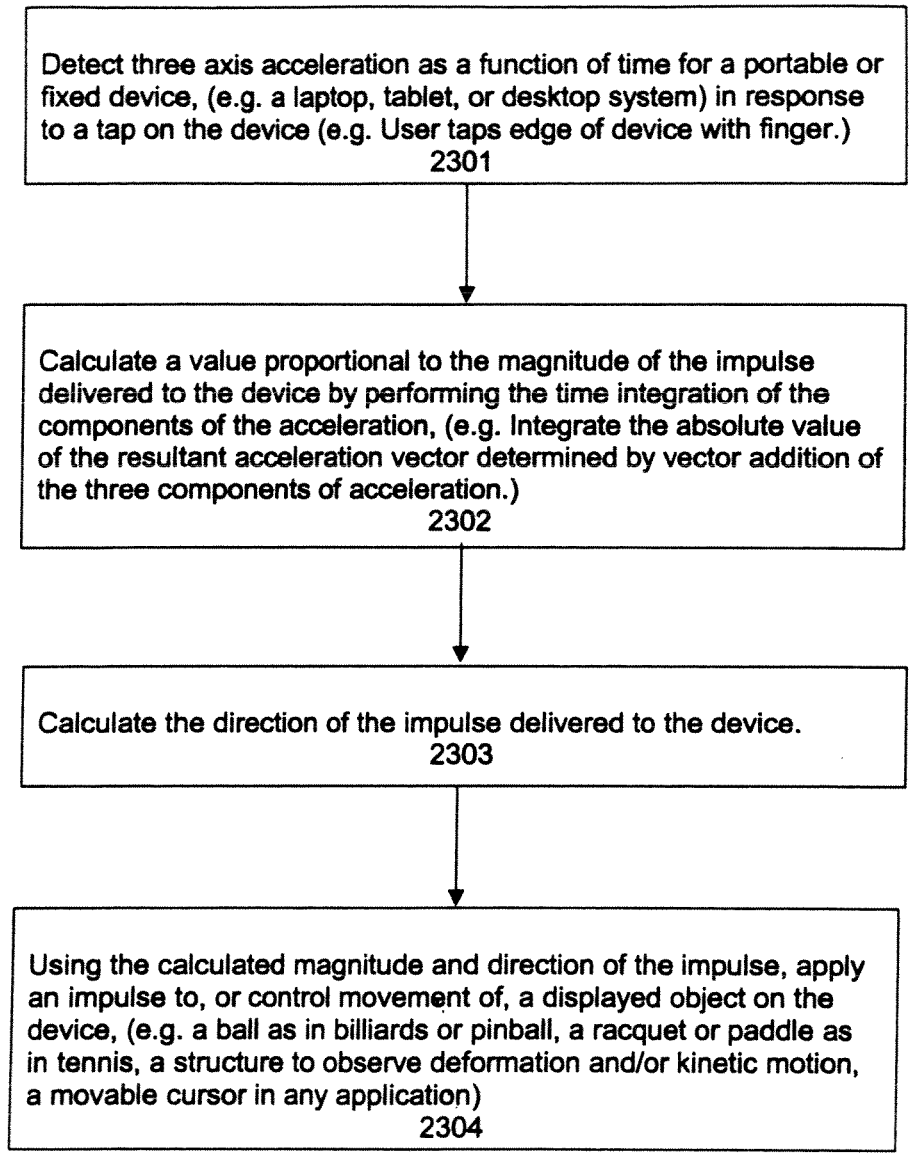
FIG. 23 is flow diagram illustrating an exemplary process for detecting an impulse using an accelerometer, according to one embodiment of the invention.

FIG. 23 is a flow diagram illustrating an exemplary process for impulse detection according to one embodiment of the invention. Exemplary process may be performed by a processing logic that may comprise hardware (circuitry, dedicated logic, etc.), software (such as is run on a dedicated machine), or a combination of both. In one embodiment, exemplary process includes, but is not limited to, detecting a movement of a portable device using an accelerometer attached to the portable device, in response to a force applied to the portable device, calculating a magnitude and a direction of the force based on acceleration information provided by the accelerometer, and moving a displayed object from a first location to a second location on a display of the portable device, wherein the direction and distance between the first and second locations are determined based on the calculated magnitude and direction of the force.

Referring to FIG. 23, at block 2301, an accelerometer attached to a portable device detects three-axis acceleration as a function of time in response to a tap on the portable device (e.g., a user taps an edge of the portable device with a hand). At block 2302, a value is calculated proportional to a magnitude of the impulse delivered to the device by performing the time integration of the components of the three-axis acceleration. In one embodiment, the value may be determined based on the integration of the absolute value of the resultant acceleration vector, for example, determined by vector addition of the three components of the acceleration (e.g., X, Y, and Z, axis acceleration information).

At block 2303, a direction of the impulse delivered to the portable device as a result of tapping the portable device is determined. In one embodiment, the direction is calculated by a microcontroller and/or firmware coupled to the accelerometer based on the moving data provided by the accelerometer. In response to the determined impulse direction and magnitude, the application software causes a displayed object to move in a distance with a direction relatively associated with the determined direction and magnitude of the impulse. A displayed object may be a cursor. Alternatively, the displayed object may be a ball as in billiards or pinball, a bowling ball in a bowling game, a racquet or paddle as in tennis, a structure to observe deformation, and/or kinetic motion, etc. The above techniques may also be applied to other similar types of applications apparent to those with ordinary skill in the art.

Exemplary Portable Device Having an Accelerometer

Figure 20:
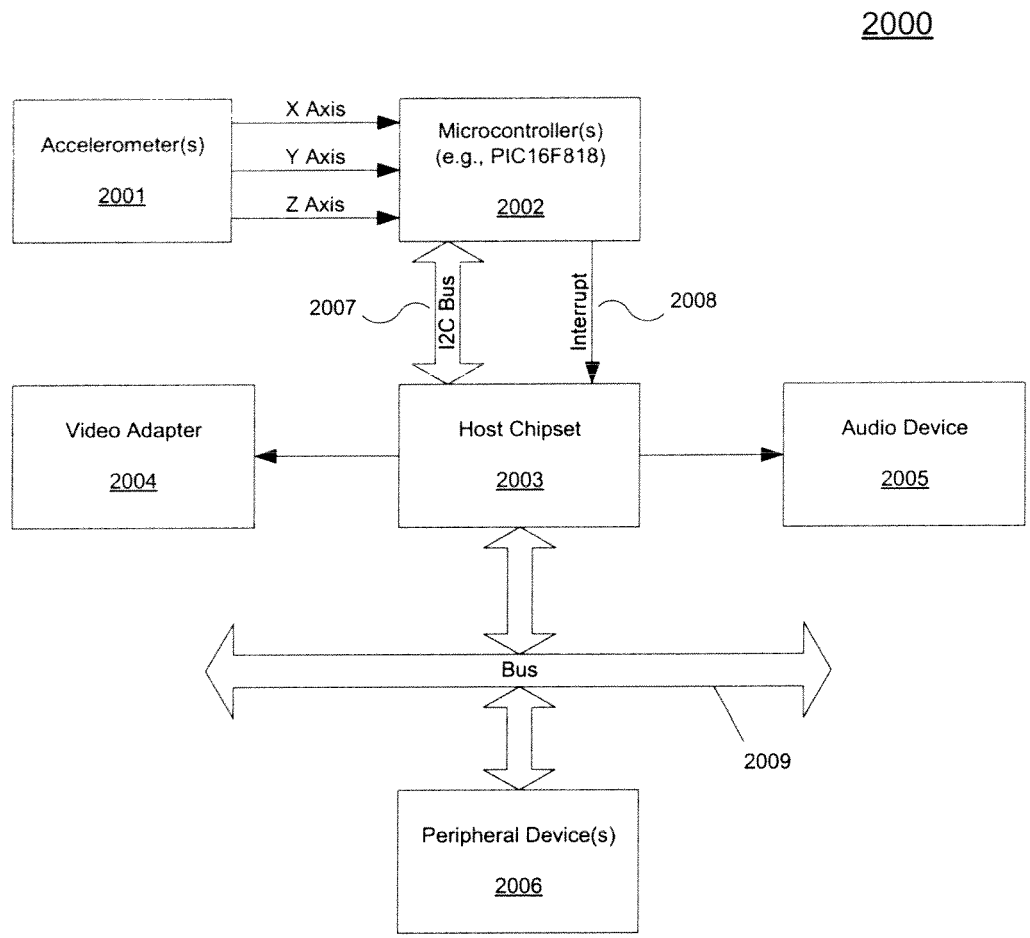
FIG. 20 is a block diagram illustrating an exemplary portable device having an accelerometer according to one embodiment of the invention.

FIG. 20 is a block diagram illustrating an exemplary portable device having an accelerometer according to one embodiment of the invention. For example, exemplary system 2000 may represent at least a portion (e.g., a subsystem) of the exemplary system 100 shown in FIG. 1 or exemplary system 2100 of FIG. 21. Referring to FIG. 20, exemplary system 2000 includes one or more accelerometers 2001, one or more microcontrollers 2002, a host chipset 2003 that may be coupled to a video adapter 2004 and an audio device 2005, and one or more peripheral devices 2006.

In one embodiment, the accelerometer 2001 is a 3-axis accelerometer, which may provide acceleration data on X, Y, and Z axes. The accelerometer is an electromechanical micro machine encapsulated in a chip package. It presents three analog outputs (e.g., X, Y, and Z axes) whose values are directly proportional to the acceleration being measured along corresponding axes in 3-space. In one embodiment, the accelerometer 2001 may be a KGF01 accelerometer from Kionix or an ADXL311 accelerometer from Analog Devices.

The microcontroller 2002 is responsible for monitoring the analog outputs of the accelerometer 2001 and communicating with the host via the chipset 2003. In one embodiment, the microcontroller 2002 is coupled to the host chipset 2003 via an I2C bus 2007 and an interrupt line 2008. Alternatively, the microcontroller 2002 may be integrated with the host chipset 2003. In one embodiment, the microcontroller 2002 may be a PCI 16F818 microcontroller from Microchip.

According to one embodiment, when the accelerometer 2001 detects that the portable device is moving, the microcontroller 2002 receives the 3-axis acceleration information from the accelerometer 2001 and notifies the host via the interrupt line 2008. In response, the movement data may be read out from the microcontroller 2002 via the I2C bus 2007. In one embodiment, the microcontroller 2002 may determine a moving direction based on the 3-axis acceleration information received from the accelerometer 2001. Alternatively, the host chipset may perform such operations. In one embodiment, the magnitude of the resultant acceleration vector of all three axes may be determined according to the following formula:

$$Mag(Acceleration_{resultant}) = \text{Sqrt}(X_{accel}^2 + Y_{accel}^2 + Z_{accel}^2)$$

In response to the determined magnitude of the acceleration vector, one or more software components (e.g., application software, firmware, and operating system, etc.) executed within the exemplary system 2000 may perform certain operations, for example, those described above throughout the present application. For example, an orientation of a displayed image may be adjusted via the video adapter and the sound effects may be adjusted via audio device 2005, etc. Furthermore, one or more peripheral devices 2006, such as, for example, hard drives, may be configured accordingly. Other configurations may exist.

Exemplary Data Processing System

Figure 21:
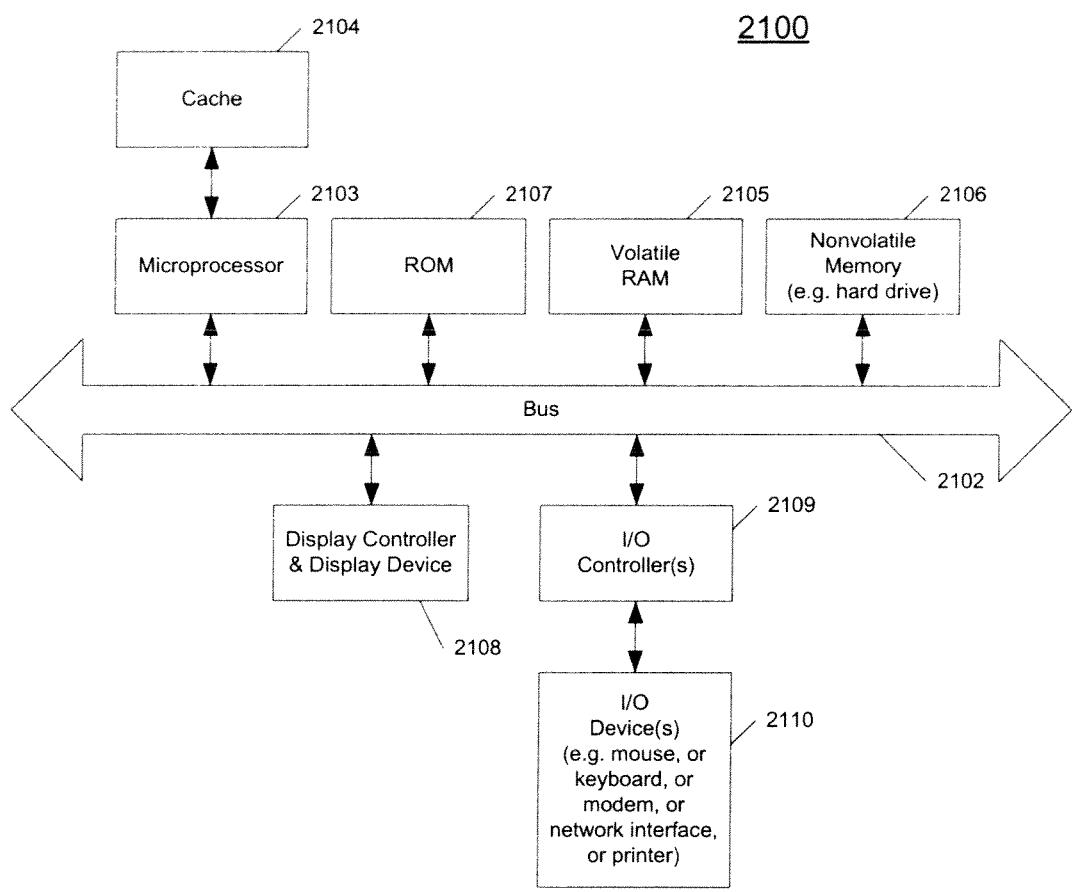
FIG. 21 is a block diagram of a digital processing system which may be used with one embodiment of the invention.

FIG. 21 is a block diagram of a digital processing system which may be used with one embodiment of the invention. For example, the system 2100 shown in FIG. 21 may be used as the exemplary systems shown in FIGS. 1 and 20.

Note, that while FIG. 21 illustrates various components of a computer system, it is not intended to represent any particular architecture or manner of interconnecting the components, as such details are not germane to the present invention. It will also be appreciated that network computers, handheld computers, cell phones, multimedia players, and other data processing systems which have fewer components or perhaps more components may also be used with the present invention. The computer system of FIG. 21 may, for example, be an Apple Macintosh computer or an IBM compatible PC.

As shown in FIG. 21, the computer system 2100, which is a form of a data processing system, includes a bus 2102 which is coupled to a microprocessor 2103 and a ROM 2107, a volatile RAM 2105, and a non-volatile memory 2106. The microprocessor 2103, which may be, for example, a PowerPC G4 or PowerPC G5 microprocessor from Motorola, Inc. or IBM, is coupled to cache memory 2104 as shown in the example of FIG. 21. The bus 2102 interconnects these various components together and also interconnects these components 2103, 2107, 2105, and 2106 to a display controller and display device 2108, as well as to input/output (I/O) devices 2110, which may be mice, keyboards, modems, network interfaces, printers, and other devices which are well-known in the art. Typically, the input/output devices 2110 are coupled to the system through input/output controllers 2109. The volatile RAM 2105 is typically implemented as dynamic RAM (DRAM) which requires power continuously in order to refresh or maintain the data in the memory. The non-volatile memory 2106 is typically a magnetic hard drive, a magnetic optical drive, an optical drive, or a DVD RAM or other type of memory system which maintains data even after power is removed from the system. Typically, the non-volatile memory will also be a random access memory, although this is not required. While FIG. 21 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 2102 may include one or more buses connected to each other through various bridges, controllers, and/or adapters, as is well-known in the art. In one embodiment, the I/O controller 2109 includes a USB (Universal Serial Bus) adapter for controlling USB peripherals. Alternatively, I/O controller 2109 may include an IEEE-1394 adapter, also known as FireWire adapter, for controlling FireWire devices. Other components may be included.

Thus, methods and apparatuses for operating a portable device using an accelerometer have been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of operating a portable device, the method comprising:
    displaying a first page of a document on a display;
    detecting movement of the portable device using an accelerometer attached to the portable device;
    determining a direction of the movement based on movement data provided by the accelerometer;
    comparing the determined direction of the movement with a predetermined direction of movement to determine whether the determined direction matches the predetermined direction; and
    if the determined direction matches the predetermined direction, displaying a second page of the document on the display based on the determined direction of the movement, wherein
    the second page of the document is different from the first page of the document; and
    the predetermined direction of movement is associated with a user-configured profile that associates the predetermined direction of movement with at least one of:
        a given time of day; or
        a location of the portable device.

2. The method as in claim 1, wherein the document comprises a text document produced by a word processing application.

3. The method as in claim 1, wherein the second page comprises a next page of the document.

4. The method as in claim 1, wherein the second page comprises a previous page of the document.

5. The method as in claim 1, wherein the predetermined direction is user configurable using a user interface.

6. The method as in claim 1, wherein the document comprises a web site presented by a browser and the first and second pages each comprise web pages on the web site.

7. The method as in claim 1, wherein the document comprises a slide presentation produced by a presentation application.

8. The method as in claim 1, wherein the movement of the portable device comprises movement that is parallel with a surface of the portable device.

9. The method as in claim 1, wherein the movement of the portable device comprises a rotation of the portable device about an axis that is parallel with an edge of the portable device.

10. The method as in claim 1, wherein the movement of the portable device comprises movement responsive to an oscillation of a surface supporting the portable device.

11. The method as in claim 1, wherein the predetermined direction of movement comprises a predetermined direction and a predetermined threshold of movement.

12. A portable device for presenting a document, comprising:
    a display;
    an accelerometer;
    a memory having instructions stored therein; and
    a processor coupled to the accelerometer, the memory, and the display, wherein the processor executes instructions from the memory to:
        display a first page of the document on the display;
        detect whether the portable device is moving using the accelerometer;
        determine a direction of the movement based on movement data received from the accelerometer;
        compare the determined direction of the movement with a predetermined direction of movement to determine whether the determined direction matches the predetermined direction; and
        if the determined direction matches the predetermined direction, display a second page of the document on the display based on the determined direction of the movement, wherein
        the second page of the document is different from the first page of the document; and
        the predetermined direction of movement is associated with a user-configured profile that associates the predetermined direction of movement with at least one of:
            a given time of day; or
            a location of the portable device.

13. The portable device as in claim 12, wherein the document comprises at least one of a word document produced by a word processing application, a slide presentation produced by a presentation application, or a web site presented by a browser and the first and second pages each comprise web pages on the web site.

14. The portable device as in claim 12, wherein the second page comprises a next page of the document.

15. The portable device as in claim 12, wherein the second page comprises a previous page of the document.

16. The portable device as in claim 12, wherein the movement of the portable device comprises one of:
    a movement that is parallel with a surface of the portable device;
    a rotation of the portable device about an axis that is parallel with an edge of the portable device; or
    movement that is responsive to an oscillation of a surface supporting the portable device.

17. The portable device as in claim 12, wherein the predetermined direction of movement comprises a predetermined direction and a predetermined threshold of movement.

* * * * *